United States Patent
Etoh

(10) Patent No.: US 10,146,107 B2
(45) Date of Patent: Dec. 4, 2018

(54) AUTONOMOUS TRAVELING APPARATUS

(71) Applicant: Sharp Kabushiki Kaisha, Osaka (JP)

(72) Inventor: Atsushi Etoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/235,195

(22) Filed: Aug. 12, 2016

(65) Prior Publication Data

US 2017/0052542 A1 Feb. 23, 2017

(30) Foreign Application Priority Data

Aug. 21, 2015 (JP) .................................. 2015-163459

(51) Int. Cl.
| | |
|---|---|
| *G05D 1/02* | (2006.01) |
| *G03B 17/56* | (2006.01) |
| *F16M 11/42* | (2006.01) |
| *F16M 11/28* | (2006.01) |
| *F16M 11/18* | (2006.01) |
| *F16M 11/38* | (2006.01) |
| *B25J 5/00* | (2006.01) |
| *B25J 9/16* | (2006.01) |
| *B25J 19/02* | (2006.01) |

(52) U.S. Cl.
CPC ............ *G03B 17/561* (2013.01); *B25J 5/007* (2013.01); *B25J 9/162* (2013.01); *B25J 19/023* (2013.01); *F16M 11/18* (2013.01); *F16M 11/28* (2013.01); *F16M 11/38* (2013.01); *F16M 11/42* (2013.01); *G05D 1/0223* (2013.01); *G05D 2201/0209* (2013.01)

(58) Field of Classification Search
None
See application file for complete search history.

(56) References Cited

U.S. PATENT DOCUMENTS

| 6,272,413 | B1 * | 8/2001 | Takahashi | ............. B66F 11/046 182/115 |
| 7,568,547 | B2 * | 8/2009 | Yamada | ............. B66F 9/07572 180/282 |

(Continued)

FOREIGN PATENT DOCUMENTS

JP 2008-129813 6/2008

*Primary Examiner* — Tamara L Weber
(74) *Attorney, Agent, or Firm* — Renner Otto Boisselle & Sklar, LLP

(57) ABSTRACT

An autonomous traveling apparatus includes: an apparatus main body; an autonomous traveling control portion which causes the apparatus main body to autonomously travel with a designated traveling parameter; a boom provided on the apparatus main body; a lifting and lowering control portion which lifts and lowers a position of one end of the boom to a designated height on the apparatus main body; and a state control portion which controls the autonomous traveling control portion so that the traveling parameter is limited based on the position of the one end of the boom or controls the lifting and lowering control portion so that the position of the one end of the boom is limited based on the traveling parameter. With such a configuration, provided is the autonomous traveling apparatus capable of safely performing autonomous traveling, and lifting and lowering of the one end of the boom.

9 Claims, 22 Drawing Sheets

(56) References Cited

U.S. PATENT DOCUMENTS

2006/0213167 A1* 9/2006 Koselka ............... A01D 46/30
56/10.2 A
2015/0198936 A1* 7/2015 McGee ............... H04W 88/00
700/40

* cited by examiner

| POSITION (HEIGHT) "H" | VELOCITY LIMIT "Vlimit" $Vlimit = Vmax - (H \times C1)$ ("C1" IS CONSTANT) |
|---|---|
| 0 | $Vlimit = Vmax - (0 \times C1)$ $= Vmax$ |
| ⋮ | ⋮ |
| $Hmax/2$ | $Vlimit = Vmax - (Hmax/2 \times C1)$ $= Vmax/2$ |
| ⋮ | ⋮ |
| $Hmax$ | $Vlimit = Vmax - (Hmax \times C1)$ $= 0$ |

| POSITION (HEIGHT) "H" | VELOCITY LIMIT "Vlimit" Vlimit=Vmax−((H×C1)×(P1×P2×P3)) ("C1" IS CONSTANT) | | CONDITION |
|---|---|---|---|
| 0 | Vlimit=Vmax−((0×C1)×(P1×P2×P3)) | | IN THE CASE OF Vlimit<0, Vlimit=0 |
| : : | : : | | |
| Hmax/2 | Vlimit=Vmax−((Hmax/2×C1)×(P1×P2×P3)) | | Vlimit=Vset WHEN SLOWDOWN CONTROL SIGNAL "Cslow" IS ISSUED |
| : : | : : | | |
| Hmax | Vlimit=Vmax−((Hmax×C1)×(P1×P2×P3)) | | IN THE CASE OF Vlimit=0 |

| INSTABILITY OF ROAD SURFACE | CONSTANT "P1" |
|---|---|
| 0 | 1 |
| . | . |
| . | . |
| . | . |
| α OR MORE | 2 |

| AIRFLOW (WIND VELOCITY) | CONSTANT "P2" |
|---|---|
| 0 | 1 |
| . | . |
| . | . |
| . | . |
| β OR MORE | 2 |

| INCLINATION ANGLE | CONSTANT "P3" |
|---|---|
| 0 | 1 |
| . | . |
| . | . |
| . | . |
| γ OR MORE | 2 |

| POSITION (HEIGHT) "H" | VELOCITY LIMIT "Vlimit"<br>Vlimit=Vmax−((H×C1)×(P1×P2×P3))<br>("C1" IS CONSTANT) | CONDITION | LIMIT OF MOVING DIRECTION |
|---|---|---|---|
| 0 | Vlimit=Vmax−((0×C1)×(P1×P2×P3)) | | NO LIMIT |
| . . . | . . . | IN THE CASE OF Vlimit<0,<br>Vlimit=0 | |
| Hmax/2 | Vlimit=Vmax−((Hmax/2×C1)×(P1×P2×P3)) | Vlimit=Vset WHEN SLOWDOWN CONTROL SIGNAL Cslow IS ISSUED IN THE CASE OF Vlimit≠0 | VELOCITY OF SLALOM TRAVELING OR STATIONARY ROTATION IS LIMITED TO ONE HALF OF VELOCITY LIMIT "Vlimit" |
| . . . | . . . | | |
| Hmax | Vlimit=Vmax−((Hmax×C1)×(P1×P2×P3)) | t=0 | SLALOME TRAVELING OR STATIONARY ROTATION IS PROHIBITED |

| POSITION (HEIGHT) "H" | LIMIT VALUE OF ACCELERATION AND DECELERATION "ADlimit" ADlimit=ADmax−((H×C2) × (P1×P2×P3)) ("C2" IS CONSTANT) | CONDITION | LIMIT OF MOVING DIRECTION |
|---|---|---|---|
| 0 | ADlimit=ADmax−((0×C2) × (P1×P2×P3)) | | NO LIMIT |
| ... | ... | | |
| Hmax/2 | ADlimit=ADmax−((Hmax/2×C1) × (P1×P2×P3)) | | VELOCITY OF SLALOM TRAVELING OR STATIONARY ROTATION IS LIMITED TO ONE HALF OF LIMIT OF ACCELERATION AND DECELERATION "ADlimit" |
| ... | ... | IN THE CASE OF ADlimit<0, ADlimit=0 | |
| Hmax | ADlimit=ADmax−((Hmax×C1) × (P1×P2×P3)) | | SLALOM TRAVELING OR STATIONARY ROTATION IS PROHIBITED |

| VELOCITY "V" | LIMIT VALUE OF HEIGHT "Hlimit" Hlimit=Hmax−((V×C3)×(P1×P2×P3)) ("C3" IS CONSTANT) | CONDITION |
|---|---|---|
| 0 | Hlimit=Hmax−((0×C3)×(P1×P2×P3)) | |
| ... | ... | |
| Vmax/2 | Hlimit=Hmax−((Vmax/2×C3)×(P1×P2×P3)) | ... |
| ... | ... | |
| Vmax | Hlimit=Hmax−((Vmax×C3)×(P1×P2×P3)) | IN THE CASE OF Hlimit<0, Hlimit=0 |

| VALUE OF ACCELERATION AND DECELERATION "AD" | LIMIT VALUE OF HEIGHT "Hlimit" Hlimit=Hmax−((AD×C4)×(P1×P2×P3)) ("C4" IS CONSTANT) | CONDITION |
|---|---|---|
| 0 | Hlimit=Hmax−((0×C4)×(P1×P2×P3)) | |
| ... | ... | |
| ADmax/2 | Hlimit=Hmax−((ADmax/2×C4)×(P1×P2×P3)) | |
| ... | ... | |
| ADmax | Hlimit=Hmax−((ADmax×C4)×(P1×P2×P3)) | IN THE CASE OF Hlimit<0, Hlimit=0 |

170

AUTONOMOUS TRAVELING APPARATUS

This Nonprovisional application claims priority under 35 U.S.C. 119 (a) on Patent Application No. 2015-163459 filed in Japan on 21 Aug. 2015, the entire contents of which are hereby incorporated by reference.

BACKGROUND OF THE INVENTION (1) Field of the Invention

The present invention relates to an autonomous traveling apparatus capable of autonomous traveling and provided with a boom.

(2) Description of the Prior Art

BACKGROUND ART

An autonomous traveling apparatus which autonomously travels by driving wheels has been developed. The autonomous traveling apparatus is used, for example, when an obstacle on a traveling route (patrol route) is monitored. For example, when the obstacle is a suspicious object or a suspicious person, the autonomous traveling apparatus needs to continuously perform monitoring by using a monitoring camera or the like in order to grasp movement of the obstacle (or a suspicious object or a suspicious person).

For example, when a suspicious object (or a suspicious person) moves to a high position or when a suspicious object (or a suspicious person) exists on an opposite side of a partition such as a wall, monitoring using a boom and a monitoring camera is effective. The boom is provided on an apparatus main body of an autonomous traveling apparatus and the monitoring camera is attached to the boom. Specifically, one end of the boom is connecting to the monitoring camera and the other end of the boom is connected to the apparatus main body. By lifting and lowering a position of the one end of the boom to a designated height, the autonomous traveling apparatus is able to continuously monitor the suspicious object (or the suspicious person) moving to a high position or the suspicious object (or the suspicious person) existing on the opposite side of the partition such as a wall by using the monitoring camera.

However, in a case where the autonomous traveling apparatus lifts and lowers the one end of the boom while traveling at high speed or the autonomous traveling apparatus travels when the one end of the boom is at the highest position, the autonomous traveling apparatus may be brought into a dangerous state such as overturning. Thus, the autonomous traveling apparatus provided with the boom is desired to safely perform the autonomous traveling and the lifting and lowering of the one end of the boom.

Patent Literature 1 discloses a mobile robot having a boom (flexible arm).

The mobile robot described in Patent Literature 1 includes a robot main body, and the booms (flexible arm) provided on the right and left of the robot main body. The mobile robot described in Patent Document 1 is applied for models an agricultural machine as a mobile robot, and the booms (flexible arm) are used as arms for applying agrochemicals.

RELATED ART DOCUMENTS

Patent Documents

[Patent Document 1] Japanese Patent Application Laid-Open 2008-129813

SUMMARY OF THE INVENTION

Problem to be Solved by the Invention

However, since the booms (flexible arm) of the mobile robot described in Patent Document 1 are used as the arms for applying agrochemicals, the booms are provided on the right and left of the robot main body. Therefore, the mobile robot described in Patent Literature 1 does not lift and lower one end of the boom (flexible arm).

SUMMARY OF THE INVENTION

The present invention has been made in view of the above-mentioned conventional problems and aims to provide an autonomous traveling apparatus provided with a boom, which is able to safely perform autonomous traveling and lifting and lowering of one end of the boom.

Means for Solving the Problems

An autonomous traveling apparatus of the present invention includes an apparatus main body; an autonomous traveling control portion which causes the apparatus main body to autonomously travel with a designated traveling parameter; a boom provided on the apparatus main body; a lifting and lowering control portion which lifts and lowers a position of one end of the boom to a designated height on the apparatus main body; and a state control portion which controls the autonomous traveling control portion so that the traveling parameter is limited based on the position of the one end of the boom or controls the lifting and lowering control portion so that the position of the one end of the boom is limited based on the traveling parameter.

Advantages of the Present Invention

According to the present invention, the autonomous traveling apparatus provided with the boom is able to safely perform autonomous traveling and lifting and lowering of one end of the boom.

BRIEF DESCRIPTION OF THE DRAWINGS

FIG. 20 illustrates a position-to-velocity table 130 in the autonomous traveling apparatus 1 according to the third embodiment of the present invention.

FIG. 21 illustrates a road surface constant table 131 in the autonomous traveling apparatus 1 according to the third embodiment of the present invention.

FIG. 22 illustrates an airflow constant table 132 in the autonomous traveling apparatus 1 according to the third embodiment of the present invention.

FIG. 23 illustrates an inclination constant table 133 in the autonomous traveling apparatus 1 according to the third embodiment of the present invention.

FIG. 25 illustrates a position-to-velocity table 140 in the autonomous traveling apparatus 1 according to the fourth embodiment of the present invention.

FIG. 30 illustrates a position-to-acceleration and deceleration table 150 in the autonomous traveling apparatus 1 according to the fifth embodiment of the present invention.

FIG. 32 illustrates a velocity-to-position table 160 in the autonomous traveling apparatus 1 according to the sixth embodiment of the present invention.

FIG. 34 illustrates an acceleration and deceleration-to-position table 170 in the autonomous traveling apparatus 1 according to the seventh embodiment of the present invention.

DESCRIPTION OF THE PREFERRED EMBODIMENTS

Description will hereinafter be given for embodiments of the present invention with reference to the drawings.

First Embodiment

Figure 1:
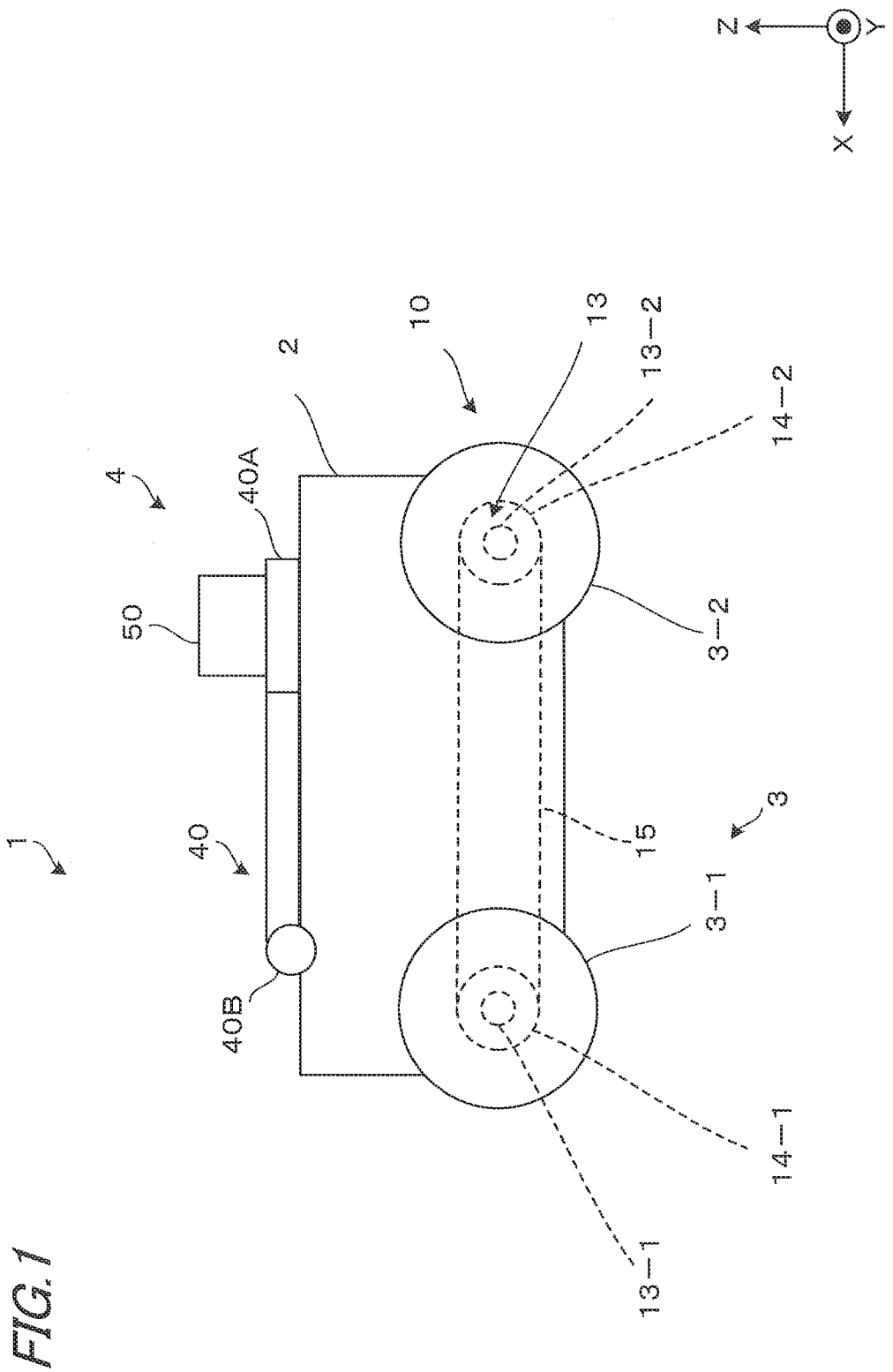
FIG. 1 is a side view of an autonomous traveling apparatus 1 according to a first embodiment of the present invention.
Figure 2:
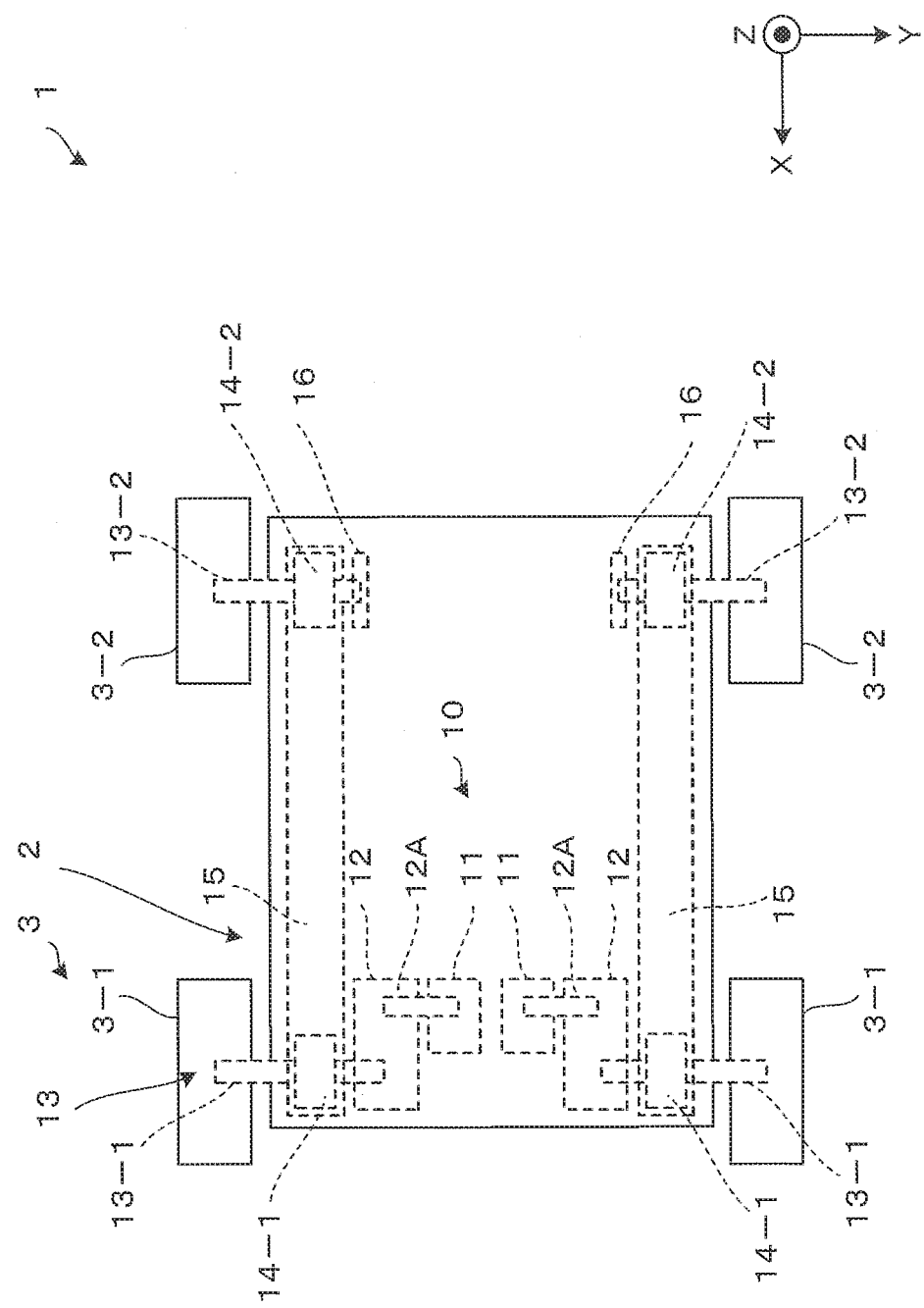
FIG. 2 is a top view of the autonomous traveling apparatus 1 according to the first embodiment of the present invention.

FIG. 1 is a side view of an autonomous traveling apparatus 1 according to a first embodiment of the present invention, and FIG. 2 is a top view of the autonomous traveling apparatus 1 according to the first embodiment of the present invention.

As illustrated in FIGS. 1 and 2, the autonomous traveling apparatus 1 includes an apparatus main body 2, a driving device 10, and four wheels 3. The four wheels 3 are classified into right and left front wheels 3-1 and right and left rear wheels 3-2.

As illustrated in FIGS. 1 and 2, a direction extending from a rear surface (rear side) of the apparatus main body 2 to a front surface (front side) of the apparatus main body 2 is referred to as an X direction in the present embodiment. A direction which extends from a right side surface of the apparatus main body 2 to a left side surface of the apparatus main body 2 and which is perpendicular to the X direction is referred to as a Y direction. A direction which extends from a bottom surface of the apparatus main body 2 to a top surface thereof and which is perpendicular to the X direction and the Y direction is referred to as a Z direction.

The driving device 10 drives the wheels 3. This driving device 10 includes right and left electric motors 11, right and left transmissions 12, four axles 13, right and left front-wheel sprockets 14-1, right and left rear-wheel sprockets 14-2, right and left belts 15, and right and left bearings 16.

The four axles 13 are classified into right and left frontwheel axles 13-1 and right and left rear-wheel axles 13-2.

A mechanism portion (driving source; with heavy weight, such as the right and left electric motors 11, of the driving device 10 is provided in one end side of the apparatus main body 2 in the apparatus main body 2. For example, when the one end side of the apparatus main body 2 is the front surface side (front side) of the apparatus main body 2, the driving source (the right and left electric motors 11 and the like) is provided on the front surface side (front side) of the apparatus main body 2 in the apparatus main body 2. In this case, among the four wheels 3, the right and left front wheels 3-1 are referred to as driving wheels and the right and left rear wheels 3-2 are referred to as driven wheels.

Each of the right and left front-wheel axles 13-1 has one end connected to each of the right and left front wheels 3-1 and the other end connected to each of the right and left transmissions 12. Each of the right and left transmissions 12 is connected to each of the right and left electric motors 11. The right and left electric motors 11 are controlled by a control device 20 described below (see FIG. 9).

Each of the right and left rear-wheel axles 13-2 has one end connected to each of the right and left rear wheels 3-2 and the other end connected to each of the right and left bearings 16.

The left side front-wheel axle 13-1 and the left side rear-wheel axle 13-2 are provided at the centers of the left side front-wheel sprocket 14-1 and the left side rear-wheel sprocket 14-2, respectively. The left side belt 15 is provided on an outer periphery of the left side front-wheel sprocket 14-1 and an outer periphery of the left side rear-wheel sprocket 14-2, and the left side front wheel 3-1 (driving wheel) and the left side rear wheel 3-2 (driven wheel) are connected by the left side belt 15. Here, the front and rear wheels 3 (the front wheel 3-1 and the rear wheel 3-2) are surrounded by, for example, the belt 15, but without limitation thereto, may be surrounded by a caterpillar formed by connecting steel plates in a belt-like shape.

The left side front wheel 3-1 (driving wheel) receives power of the left side electric motor 11 via the left side transmission 12 and rotates together with the left side front-wheel axle 13-1 and the left side front-wheel sprocket 14-1 based on the power. The left side rear wheel 3-2 (driven wheel) receives rotational movement of the left side front wheel 3-1 (driving wheel) from the left side belt 15, and rotates together with the left side rear-wheel axle 13-2 and the left side rear-wheel sprocket 14-2 based on the rotational movement.

The right side front-wheel axle 13-1 and the right side rear-wheel axle 13-2 are provided at the centers of the right side front-wheel sprocket 14-1 and the right side rear-wheel sprocket 14-2, respectively. The right side belt 15 is provided on an outer periphery of the right side front-wheel sprocket 14-1 and an outer periphery of the right side rear-wheel sprocket 14-2, and the right side front wheel 3-1 (driving wheel) and the right side rear wheel 3-2 (driven wheel) are connected by the right side belt 15.

The right side front wheel 3-1 (driving wheel) receives power of the right side electric motor 11 via the right side transmission 12 and rotates together with the right side front-wheel axle 13-1 and the right side front-wheel sprocket 14-1 based on the power. The right side rear wheel 3-2 (driven wheel) receives rotational movement of the right side front wheel 3-1 (driving wheel) from the right side belt 15, and rotates together with the right side rear-wheel axle 13-2 and the right side rear-wheel sprocket 14-2 based on the rotational movement.

Each of the transmissions 12 includes, for example, a clutch and a gear box. The gear box is constituted by a shaft 12A having one end connected to the electric motor 11, a gear (not illustrated) provided around an outer periphery of the shaft 12A, and the like, and transmits the power of the driving source (electric motor 11) by changing a torque, the number of times of rotation, and a rotation direction. Thus, the transmission 12, the front-wheel axle 13-1, the rear-wheel axle 13-2, the front-wheel sprocket 14-1, the rear-wheel sprocket 14-2, and the belt 15 are configured as a power transmitting member.

The right and left electric motors 11 transmit power respectively to right and left power transmitting members to thereby drive the four wheels 3 so that the apparatus main body 2 travels or stops. That is, the autonomous traveling apparatus 1 has a structure to rotate the front wheel 3-1 (driving wheel) and the rear-wheel 3-2 (driven wheel) with one electric motor 11 at the same velocity.

It is possible not to include the transmission 12 as the power transmitting member. In this case, each of the electric motors 11 is connected to the right and left front-wheel axles 13-1, respectively, with a gear (fixed rate) to control the number of times of rotation and a rotation direction of the electric motor 11.

Timing belts, V-belts, ribbed belts, or the like may be used as the right and left belts 15 of the power transmitting member, but the right and left belts 15 are not limited thereto. For example, chains may be used instead of the belts 15.

DC motors, brushless DC motors, AC motors, or the like may be used as the right and left electric motors 11 as the driving source of the driving device 10.

As illustrated in FIG. 1, the autonomous traveling apparatus 1 further includes a monitoring device 4. The monitoring device 4 includes a boom 40 and a monitoring camera 50. The monitoring device 4 compares an image shot by the monitoring camera 50 to a background image of a traveling route and detects an obstacle (or a suspicious object or a suspicious person) on the traveling route.

The boom 40 is provided in the apparatus main body 2 and the monitoring camera 50 is mounted on the boom 40. Specifically, the monitoring camera 50 is connected to one end 40A of the boom 40 and the apparatus main body 2 is connected to the other end 40B of the boom 40.

The boom 40 may be a refraction-type boom, an expansion and contraction-type boom, or a combination thereof.

Figure 3:
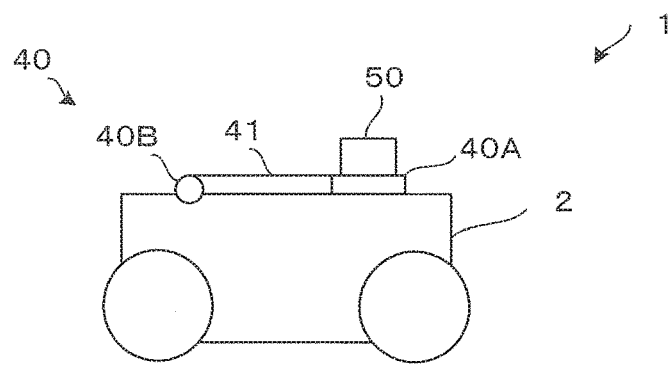
FIG. 3 is a side view of the autonomous traveling apparatus 1 according to the first embodiment of the present invention when a boom 40 of the autonomous traveling apparatus 1 is a refraction-type boom.
Figure 4:
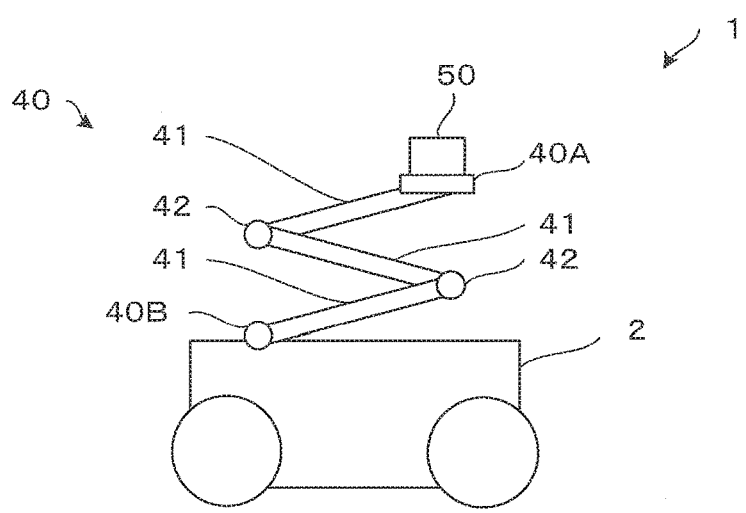
FIG. 4 is a side view of the autonomous traveling apparatus 1 according to the first embodiment of the present invention when the boom 40 of the autonomous traveling apparatus 1 is the refraction-type boom.
Figure 5:
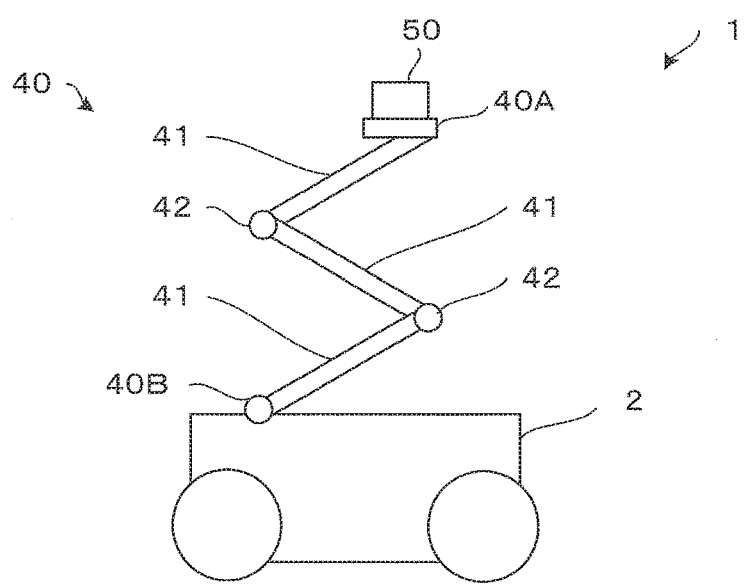
FIG. 5 is a side view of the autonomous traveling apparatus 1 according to the first embodiment of the present invention when the boom 40 of the autonomous traveling apparatus 1 is the refraction-type boom.

FIGS. 3 to 5 are side views of the autonomous traveling apparatus 1 according to the first embodiment of the present invention when the boom 40 of the autonomous traveling apparatus 1 is a refraction-type boom. The refraction-type boom 40 has M (for example, M is three) boom members 41 and (M−1) joint members 42. One joint member 42 of the (M−1) joint members 42 is provided between two boom members 41 of the M boom members 41. A cylinder (not illustrated), such as a hydraulic cylinder, is attached to the joint member 42 and the joint member 42 operates with power of this cylinder.

Figure 6:
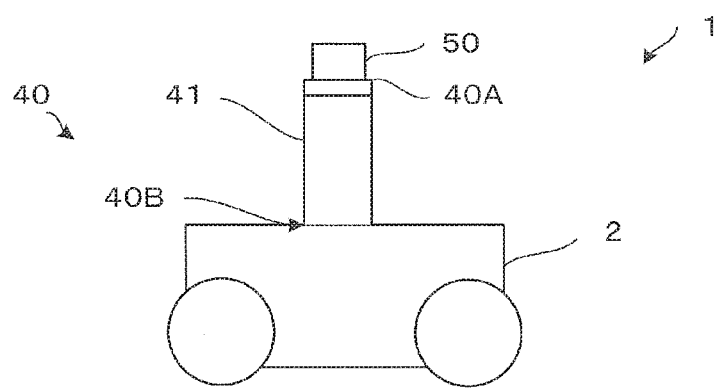
FIG. 6 is a side view of the autonomous traveling apparatus 1 according to the first embodiment of the present invention when the boom 40 of the autonomous traveling apparatus 1 is an expansion and contraction type boom.
Figure 7:
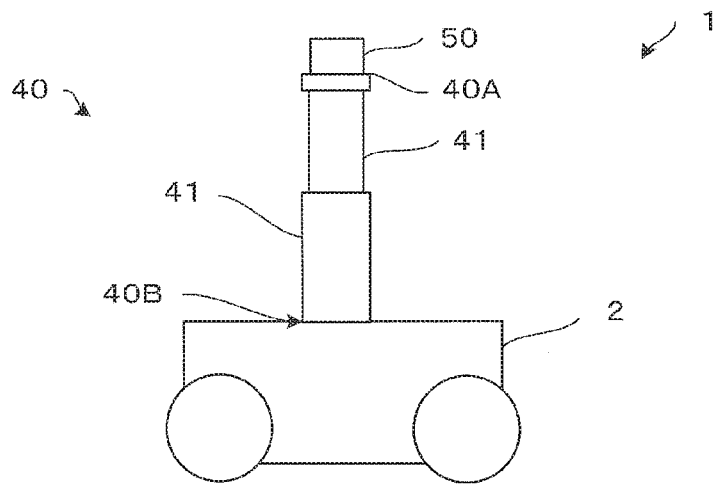
FIG. 7 is a side view of the autonomous traveling apparatus 1 according to the first embodiment of the present invention when the boom 40 of the autonomous traveling apparatus 1 is the expansion and contraction type boom.
Figure 8:
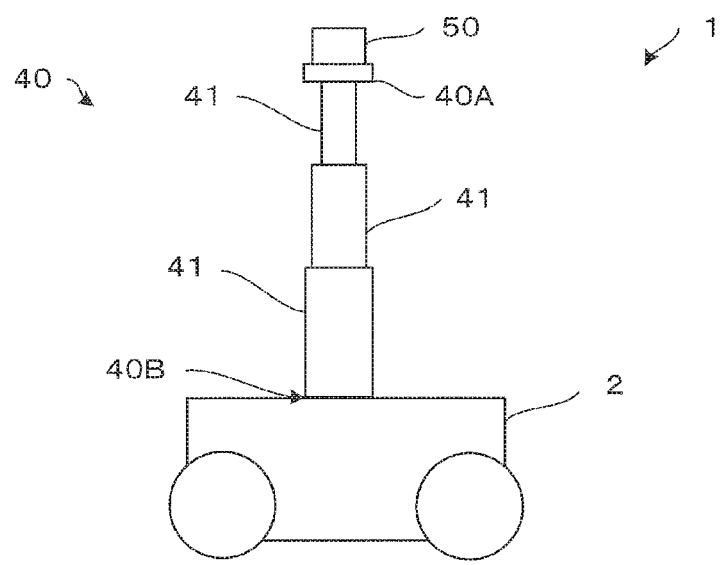
FIG. 8 is a side view of the autonomous traveling apparatus 1 according to the first embodiment of the present invention when the boom 40 of the autonomous traveling apparatus 1 is the expansion and contraction type boom.

FIGS. 6 to 8 are side views of the autonomous traveling apparatus 1 according to the first embodiment of the present invention when the boom 40 of the autonomous traveling apparatus 1 is an expansion and contraction type boom. The expandable/contractible boom 40 has N (for example, N is three) boom members 41 and two boom members 41 of the N boom members 41 are configured to be nested like a fishing rod. A cylinder (not illustrated), such as a hydraulic cylinder, is equipped inside (outside in some cases) the boom member 41 and the boom member 41 expands and contracts with expansion and contraction of this cylinder.

Figure 9:
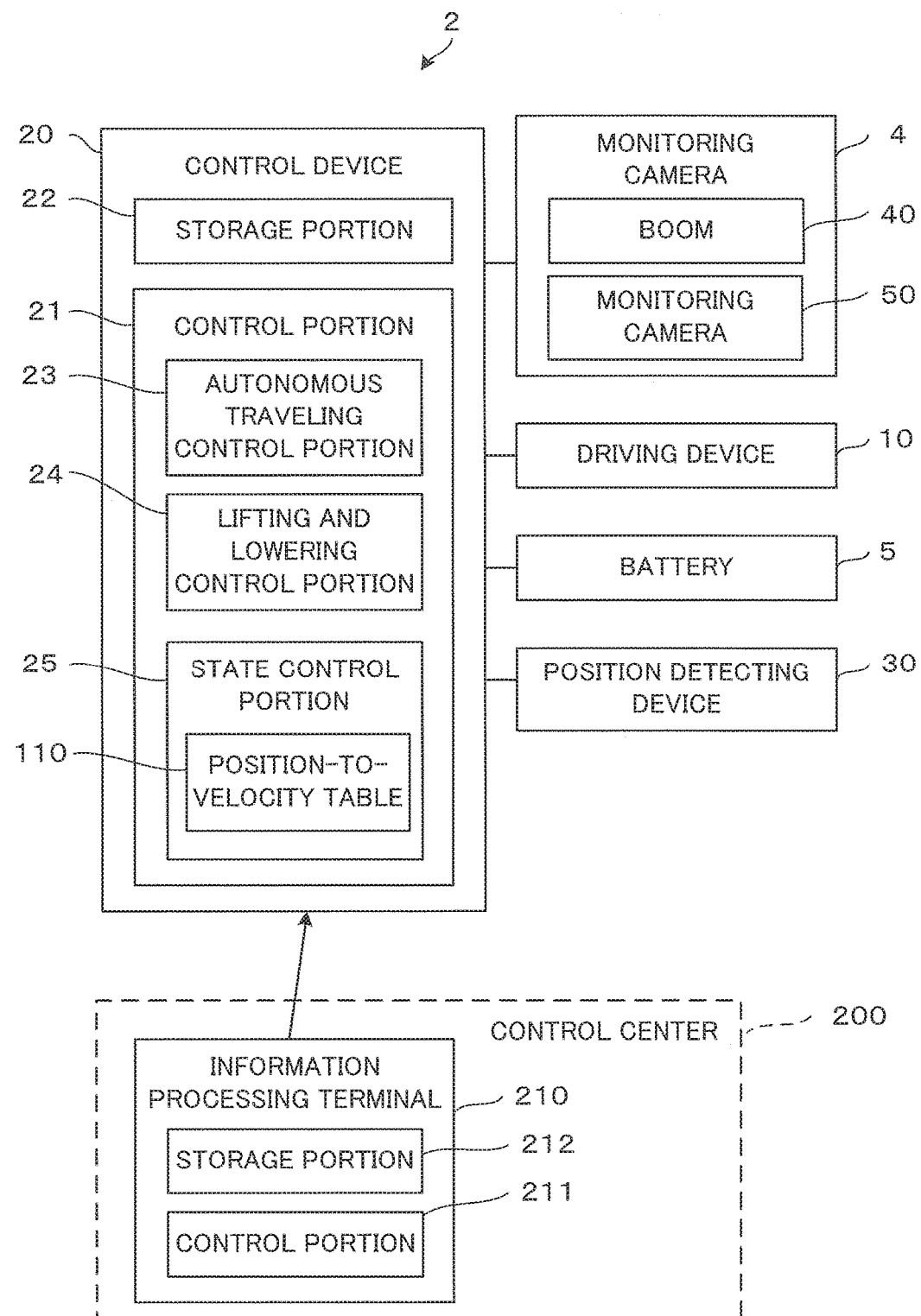
FIG. 9 is a block diagram illustrating an electric configuration of the autonomous traveling apparatus 1 according to the first embodiment of the present invention.

FIG. 9 is a block diagram illustrating an electric configuration of the autonomous traveling apparatus 1 according to the first embodiment of the present invention.

As illustrated in FIG. 9, the apparatus main body 2 of the autonomous traveling apparatus 1 further includes a control device 20 and a battery 5.

The battery 5 supplies electric power to the apparatus main body 2. An example of the battery 5 includes a rechargeable secondary battery such as a lithium ion battery or a phosphoric acid iron lithium ion battery. For example, the battery 5 is charged when the autonomous traveling apparatus 1 is kept in an installation site (not illustrated).

As shown in FIG. 9, the control device 20 is provided in the apparatus main body 2 and includes a control portion 21 and a storage portion 22. The control portion 21 is a CPU (Central Processing Unit.). A computer-executable computer program is stored in the storage portion 22 and the control portion 21 reads and executes the computer program.

As shown in FIG. 9, the control portion 21 is able to communicate with a control center 200.

An information processing terminal 210 is provided in the control center 200.

The information processing terminal 210 includes a control portion 211 and a storage portion 212.

The control portion 211 is a CPU.

A computer-executable computer program is stored in the storage portion 212 and the control portion 211 reads and executes the computer program.

A user uses the information processing terminal 210 to transmit a command, which indicates a traveling route that is set in advance, a set velocity that is designated or the like, from the control center 200 to the apparatus main body 2.

As shown in FIG. 9, the control portion 21 includes an autonomous traveling control portion 23.

The autonomous traveling control portion 23 controls the driving device 10 so that the autonomous traveling apparatus 1 (apparatus main body 2) autonomously travels by rotating the wheels 3.

The driving device 10 drives the wheels 3 under control of the autonomous traveling control portion 23.

The autonomous traveling control portion 23 controls the driving device 10 so that the autonomous traveling apparatus 3 (apparatus main body 2) autonomously travels at a designated set velocity on a traveling route which is set in advance.

As shown in FIG. 2, the autonomous traveling apparatus 1 is configured to rotate the front wheel 3-1 (driving wheel) and the rear wheel 3-2 (driven wheel) at the same velocity by one electric motor 11. Thus, when the autonomous traveling apparatus 1 goes straight, the autonomous traveling control portion 23 (FIG. 9) controls the right and left electric motors 11 of the driving device 10 so that the right and left front wheels 3-1 (driving wheels) of the wheels 3 rotate at the same rotation velocity.

Moreover, when the autonomous traveling apparatus 1 changes its advancing direction, the autonomous traveling control portion 23 (FIG. 9) controls the right and left electric motors 11 of the driving device 10 so that there is a difference between rotation velocities of the right and left front wheels 3-1 (driving wheels) of the wheels 3.

Further, when the autonomous traveling apparatus 1 turns, that is, performs stationary rotation, the autonomous traveling control portion 23 (FIG. 9) controls the right and left electric motors 11 of the driving device 10 so that rotation directions of the right and left front wheels 3-1 (driving wheels) of the wheels 3 are opposite to each other.

As shown in FIG. 9, the apparatus main body 2 of the autonomous traveling apparatus 1 further includes a position detecting device 30.

As the position detecting device 30, a technique using a satellite is used and examples thereof include GPS (Global Positioning System) of United States of America, Quasi-Zenith Satellite System (QZSS) of Japan, GLONASS (Global Navigation Satellite System) of Russia, Galileo of European Union (EU), BeiDou Navigation Satellite System of China, and IRNSS (Indian Regional Navigational Satellite System) of India.

In the case of the GPS, the position detecting device 30 has a GPS receiver.

The GPS receiver (position detecting device 30) determines position information indicating a position of the apparatus main body 2 based on a difference of receiving times when radio waves are received from a plurality of GPS satellites (not illustrated). The autonomous traveling control portion 23 causes the autonomous traveling apparatus 1 (apparatus main body 2) to autonomously travel on the traveling route based on the position information.

When the autonomous traveling apparatus 1 enters a tunnel or the like while traveling outdoors, there is a case that the GPS receiver (position detecting device 30) is not able to receive radio waves from a plurality of GPS satellites. In this case, the position detecting device 30 uses a technique by a sensor, a technique by light, a technique by the monitoring camera 50, and the like.

When using the technique by the sensor, the position detecting device 30 includes a sensor for position detection (not illustrated) such as a gyro sensor, an acceleration sensor, or a direction sensor. When the GPS receiver is not able to receive radio waves from a plurality of GPS satellites, the position detecting device 30 determines position information indicating the position of the apparatus main body 2 based on a vehicle velocity pulse and an output of the sensor for position detection.

When using the technique by light, the position detecting device 30 has a LIDAR (Light Detection and Ranging, Laser Imaging Detection and Ranging) system. When the GPS receiver is not able to receive radio waves from a plurality of GPS satellites, the LIDAR system (position detecting device 30) determines position information indicating the position of the apparatus main body 2 based on a time difference from radiation of light to detection of reflected light. Here, as a technique of radiating light for sensing, laser, infrared light, visible light, ultrasonic wave, electromagnetic wave or the like is used.

Also, when the GPS receiver is not able to receive radio waves from a plurality of GPS satellites, the position detecting device 30 may compare an image shot by the monitoring camera 50 to a background image of a traveling route and determine position information based on the comparison result. Alternatively, the position detecting device 30 may determine position information with a method combining the aforementioned technique (the technique by the sensor and/or the technique by light) and the monitoring camera 50.

As shown in FIG. 9, the control portion 21 further includes a lifting and lowering control portion 24. When an obstacle (for example, a suspicious object) is detected by the monitoring camera 50, the lifting and lowering control portion 24 controls the boom 40 so that a position of the one end 40A of the boom 40 is lifted and lowered to a designated height.

For example, when the boom 40 is the refraction-type boom, the lifting and lowering control portion 24 controls the cylinder (not illustrated) so that the joint members 42 of the refraction-type boom 40 operates (see FIGS. 3 to 5).

For example, when the boom 40 is an expansion and contraction-type boom, the lifting and lowering control portion 24 controls the cylinder (not illustrated) so that the boom members 41 of the expansion and contraction-type boom 40 expand/contract (see FIGS. 6 to 8).

As shown in FIG. 9, the control portion 21 further includes a state control portion 25.

The state control portion 25 controls the autonomous traveling control portion 23 so that a traveling parameter is limited based on a position of the one end 40A (FIG. 1) of the boom 40 (FIGS. 1 and 9). The traveling parameter is a velocity of the apparatus main body 2.

As shown in FIG. 9, the state control portion 25 includes a position-to-velocity table 110.

Figures 10, 11:
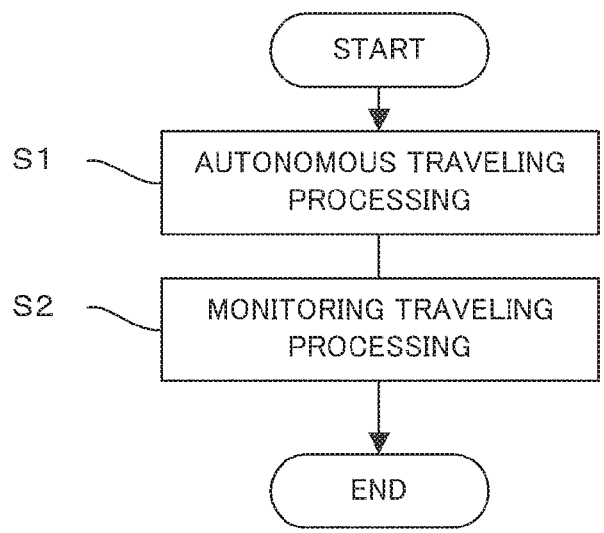
FIG. 10 illustrates a position-to-velocity table 110 in the autonomous traveling apparatus 1 according to the first embodiment of the present invention.
FIG. 11 is a flowchart illustrating an operation of the autonomous traveling apparatus 1 according to the first embodiment of the present invention.

FIG. 10 illustrates the position-to-velocity table 110 in the autonomous traveling apparatus 1 according to the first embodiment of the present invention.

When a velocity limit of the apparatus main body 2 (FIGS. 1, 2 and 9) is "Vlimit", a maximum velocity is "Vmax", a position (height) of the one end 40A (FIG. 1) of the boom 40 (FIGS. 1 and 9) is "H", and a constant is "C1" in the position-to-velocity table 110, the velocity limit "Vlimit" of the apparatus main body 2 (FIGS. 1, 2 and 9) is determined by the equation "Vlimit=Vmax−(H×C1)".

Note that, when the position "H" is the highest position "Hmax", the constant C1 is a value being satisfying the equation "Vlimit=Vmax−(Hmax×C1)=0".

The state control portion 25 (FIG. 9) controls the autonomous traveling control portion 23 (FIG. 9) so that the velocity of the apparatus main body 2 (FIGS. 1, 2 and 9) is limited by the equation "Vlimit=Vmax−(H×C1)", that is, based on the velocity limit "Vlimit" according to the position "H" of the one end 40A (FIG. 1) of the boom 40 (FIGS. 1 and 9).

Next, an operation of the autonomous traveling apparatus 1 according to the first embodiment of the present invention will be described.

Figure 12:
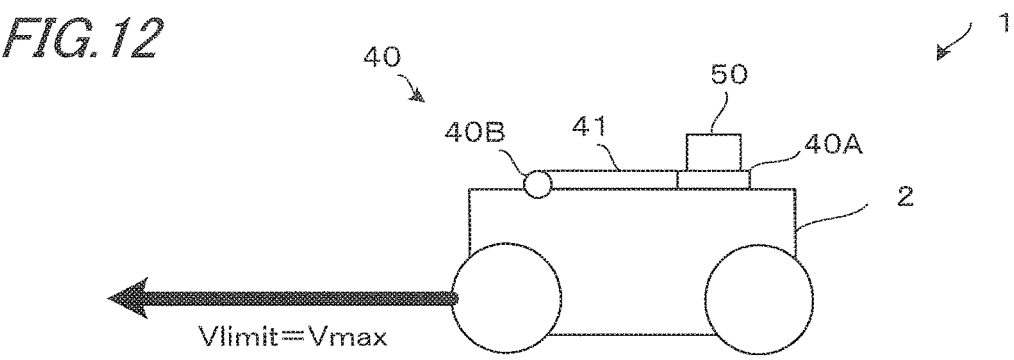
FIG. 12 is a view for explaining a monitoring traveling processing (step S2) as the operation of the autonomous traveling apparatus 1 according to the first embodiment of the present invention.
Figure 13:
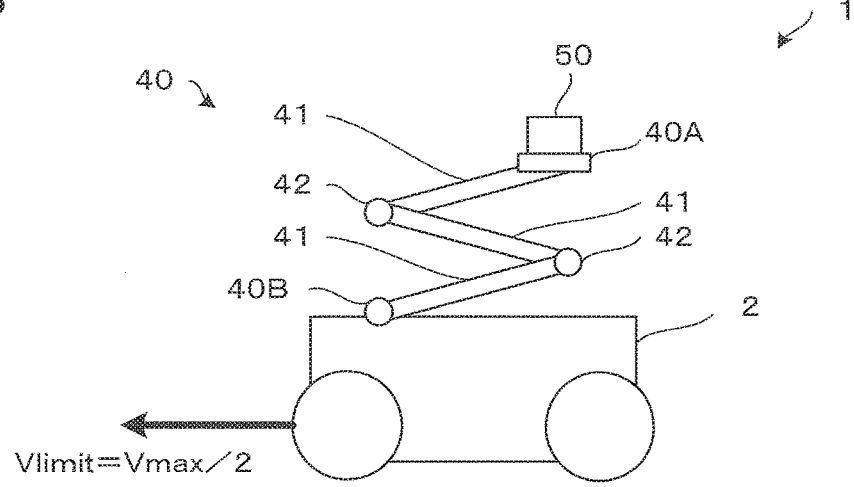
FIG. 13 is a view for explaining a monitoring traveling processing (step S2) as the operation of the autonomous traveling apparatus 1 according to the first embodiment of the present invention.
Figure 14:
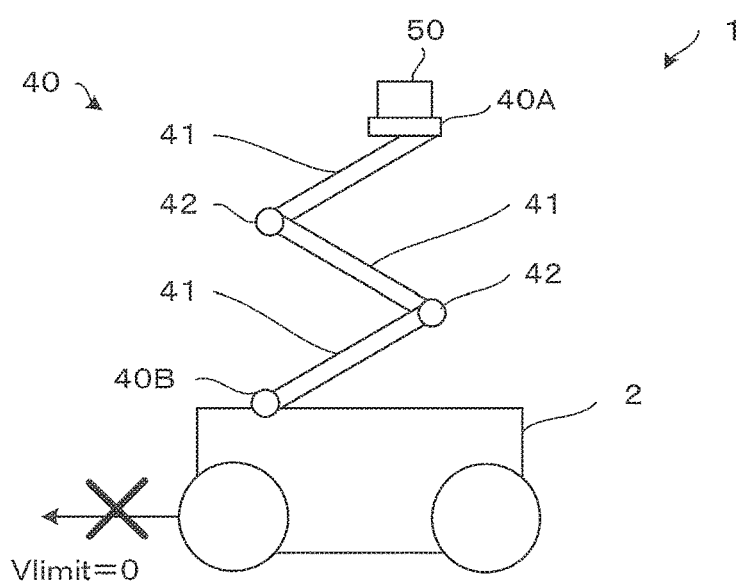
FIG. 14 is a view for explaining a monitoring traveling processing (step S2) as the operation of the autonomous traveling apparatus 1 according to the first embodiment of the present invention.

FIG. 11 is a flowchart illustrating an operation of the autonomous traveling apparatus 1 according to the first embodiment of the present invention. FIGS. 12 to 14 are views for explaining monitoring traveling processing (step S2) as the operation of the autonomous traveling apparatus 1 according to the first embodiment of the present invention.

First, as shown in FIG. 12, the autonomous traveling apparatus 1 performs the autonomous traveling processing (step S1 in FIG. 11). In this autonomous traveling processing (step S1), the autonomous traveling control portion 23 (FIG. 9) of the autonomous traveling apparatus 1 controls the driving device 10 (FIGS. 1, 2 and 9) so that the apparatus main body 2 autonomously travels.

Here, it is assumed that the monitoring device 4 detects an obstacle (for example, a suspicious object) on a traveling route as a result of comparing an image shot by the monitoring camera 50 to a background image of the traveling route as shown in FIG. 12. In this case, the autonomous traveling apparatus 1 performs the following monitoring traveling processing (step S2).

In the monitoring traveling processing (step S2), when the position "H" of the one end 40A of the boom 40 is "0" indicating the lowest position (see FIG. 10) as shown in FIG. 12, the state control portion 25 (FIG. 9) of the autonomous traveling apparatus 1 calculates the maximum velocity "Vmax" as the velocity limit "Vlimit" of the apparatus main body 2 by the equation "Vlimit=Vmax−(0×C1)=Vmax" (see FIG. 10) In this case, the state control portion 25 (FIG. 9) outputs, to the autonomous traveling control portion 23 (FIG. 9), velocity limit information for designating the maximum velocity "Vmax" as the velocity limit "Vlimit" of the apparatus main body 2. The autonomous traveling control portion 23 (FIG. 9) causes the apparatus main body 2 to autonomously travel according to the velocity limit information.

Further, in the monitoring driving processing (step S2), when the position "H" of the one end 40A of the boom 40 is "Hmax/2" indicating a position at one half height of the highest position "Hmax" (see to FIG. 10) as shown in FIG. 13, the state control portion 25 (FIG. 9) of the autonomous traveling apparatus 1 calculates one half of the maximum velocity "Vmax" as the velocity limit "Vlimit" of the apparatus main body 2 by the equation "Vlimit=Vmax−(Hmax/2×C1)=Vmax/2" (see FIG. 10). In this case, the state control portion 25 (FIG. 9) outputs, to the autonomous traveling control portion 23 (FIG. 9), velocity limit information for designating one half of the maximum velocity "Vmax" as the velocity limit "Vlimit" of the apparatus main body 2. The autonomous traveling control portion 23 (FIG. 9) causes the apparatus main body 2 to autonomously travel according to the velocity limit information.

Further, in the monitoring traveling processing (step S2), when the position "H" of the one end 40A of the boom 40 is the highest position "Hmax" (see FIG. 10) as shown in FIG. 14, the state control portion 25 (FIG. 9) of the autonomous traveling apparatus 1 calculates "0" as the velocity limit "Vlimit" of the apparatus main body 2 by the equation "Vlimit=Vmax−(Hmax×C1)=0" (see FIG. 10). In this case, the state control portion 25 (FIG. 9) outputs, to the autonomous traveling control portion 23 (FIG. 9), velocity limit information for designating "0" as the velocity limit "Vlimit" of the apparatus main body 2. The autonomous traveling control portion 23 (FIG. 9) prohibits traveling of the apparatus main body 2 according to the velocity limit information.

According to the description above, the autonomous traveling apparatus 1 according to the first embodiment of the present invention includes the apparatus main body 2, the autonomous traveling control portion 23 which causes the apparatus main body 2 to autonomously travel with a designated traveling parameter, the boom 40 provided on the apparatus main body 2, the lifting and lowering control portion 24 which lifts and lowers the position "H" of the one end 40A of the boom 40 to the designated height on the apparatus main body 2, and the state control portion 25 which controls the autonomous traveling control portion 23 so that the traveling parameter is limited based on the position "H" of the one end 40A of the boom 40.

Moreover, in the autonomous traveling apparatus 1 according to the first embodiment of the present invention, the traveling parameter is a velocity of the apparatus main body 2, and the state control portion 25 controls the traveling control portion 23 so that the velocity of the apparatus main body 2 is limited by the velocity limit "Vlimit" according to the position "H" of the one end 40A of the boom 40.

In this manner, according to the autonomous traveling apparatus 1 according to the first embodiment of the present invention, the traveling parameter (velocity of the apparatus main body 2) is limited based on the position "H" of the one end 40A of the boom 40. For example, when the position "H" of the one end 40A of the boom 40 is at the highest position "Hmax", the autonomous traveling apparatus 1 prohibits traveling of the apparatus main body 2. This makes it possible to prevent the autonomous traveling apparatus 1 from being brought into a dangerous state such as overturning and also possible to continuously monitor a suspicious object (or a suspicious person) moving to a high position by using the monitoring camera 50. Thus, it is possible to safely perform autonomous traveling and lifting and lowering of the one end 40A of the boom 40 in the autonomous traveling apparatus 1 provided with the boom 40.

Second Embodiment

In the autonomous traveling apparatus 1 according to the first embodiment of the present invention, when the position "H" of the one end 40A of the boom 40 is at the highest position "Hmax", traveling of the apparatus main body 2 is prohibited based on the equation "Vlimit=Vmax−(Hmax× C1)=0", but there is no limitation thereto. In an autonomous traveling apparatus 1 according to a second embodiment of the present invention, the apparatus main body 2 may autonomously travel at a velocity at which traveling of the apparatus main body 2 is able to be stopped immediately under control of a user (under control of the control center 200) when traveling of the apparatus main body 2 is prohibited. Changes compared to the first embodiment will be described in the second embodiment.

Figure 15:
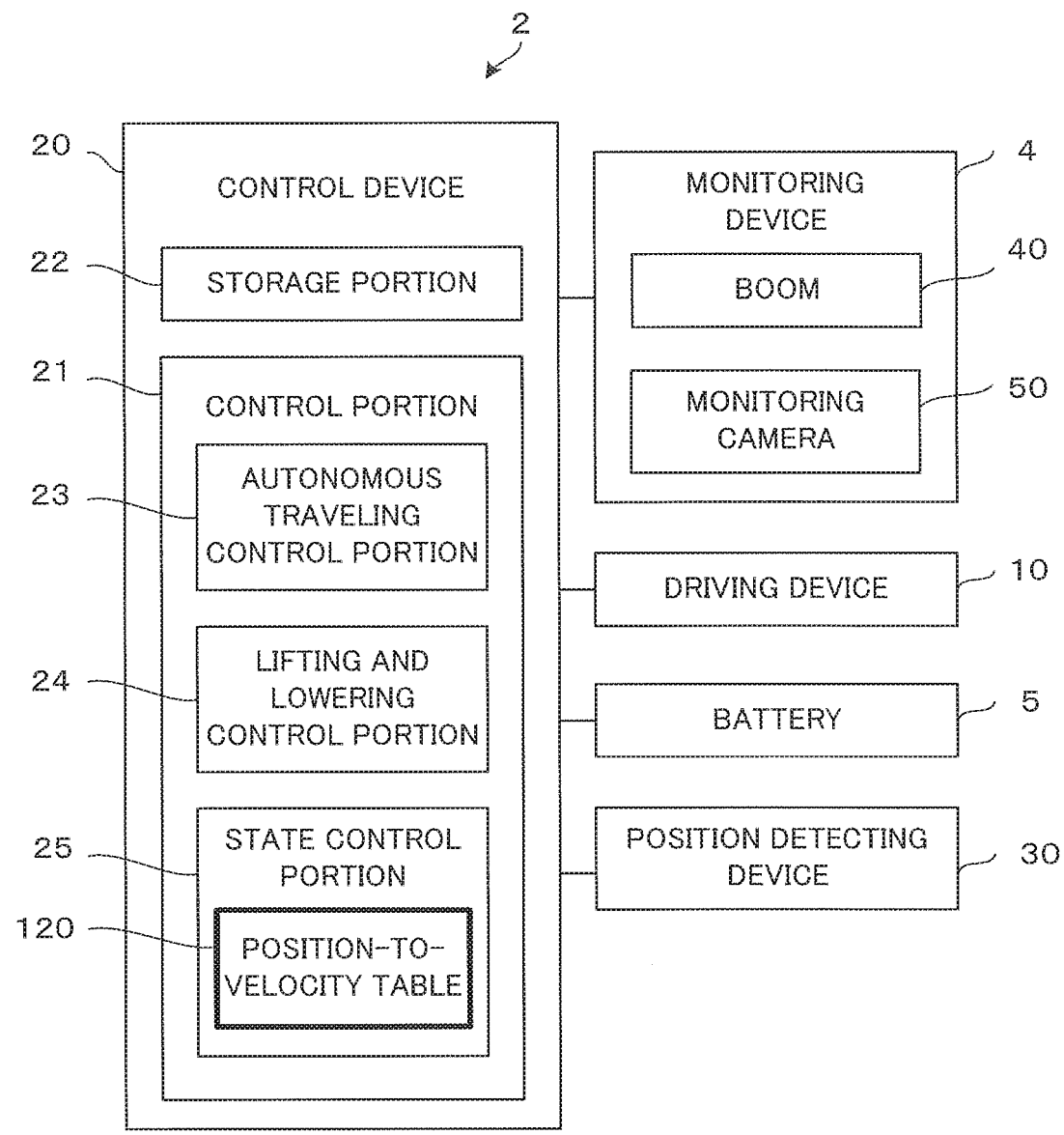
FIG. 15 is a block diagram illustrating an electric configuration of an autonomous traveling apparatus 1 according to a second embodiment of the present invention.

FIG. 15 is a block diagram illustrating an electric configuration of the autonomous traveling apparatus 1 according to the second embodiment of the present invention.

The state control portion 25 controls the autonomous traveling control portion 23 so that a traveling parameter is limited based on a position of the one end 40A (FIG. 1) of the boom 40 (FIGS. 1 and 15). The traveling parameter is a velocity of the apparatus main body 2.

As shown in FIG. 15, the state control portion 25 includes a position-to-velocity table 120 instead of the position-to-velocity table 110.

Figure 16:
FIG. 16 illustrates a position-to-velocity table 120 in the autonomous traveling apparatus 1 according to the second embodiment of the present invention.

FIG. 16 illustrates the position-to-velocity table 120 in the autonomous traveling apparatus 1 according to the second embodiment of the present invention.

When a velocity limit of the apparatus main body 2 (FIGS. 1, 2 and 15) is "Vlimit", a maximum velocity is "Vmax", a position (height) of the one end 40A (FIG. 1) of the boom 40 (FIGS. 1 and 15) is "H", and a constant is "C1" in the position-to-velocity table 120, the velocity limit "Vlimit" of the apparatus main body 2 (FIGS. 1, 2 and 9) is determined by the equation "Vlimit=Vmax−(H×C1)".

Here, in a case where a user uses the information processing terminal 210 (see FIG. 18) to output a slowdown control command Cslow from the control center 200 (see FIG. 18) while the position "H" of the one end 40A (FIG. 1) of the boom 40 (FIGS. 1 and 15) is at the highest position "Hmax" and thereby the velocity limit "Vlimit" of the apparatus main body 2 (FIGS. 1, 2 and 15) is "0" in the position-to-velocity table 120, the velocity limit. "Vlimit" of the apparatus main body 2 (FIGS. 1, 2 and 15) is forcibly determined by the equation "Vlimit=Vset". The "Vset" is a set velocity and the set velocity "Vset" is a velocity at which traveling of the apparatus main body 2 (FIGS. 1, 2 and 15) is able to be stopped immediately.

The state control portion 25 (FIG. 15) controls the autonomous traveling control portion 23 (FIG. 15) so that traveling of the apparatus main body 2 (FIGS. 1, 2 and 15) is prohibited while the position "H" of the one end 40A (FIG. 1) of the boom 40 (FIGS. 1 and 15) is at the highest position "Hmax". Thus, when the slowdown control command Cslow is received from the control center 200 (FIG. 18) in the state of Vlimit=0, that is, in a state where traveling of the apparatus main body 2 (FIGS. 1, 2 and 15) is prohibited, the state control portion 25 (FIG. 15) controls the autonomous traveling control portion 23 (FIG. 15) so that the apparatus main body 2 (FIGS. 1, 2 and 15) travels at the set velocity "Vset" at which traveling of the apparatus main body 2 (FIGS. 1, 2 and 15) is able to be stopped immediately in response to the slowdown control command "Cslow".

Next, an operation of the autonomous traveling apparatus 1 according to the second embodiment of the present invention will be described.

Figure 17:
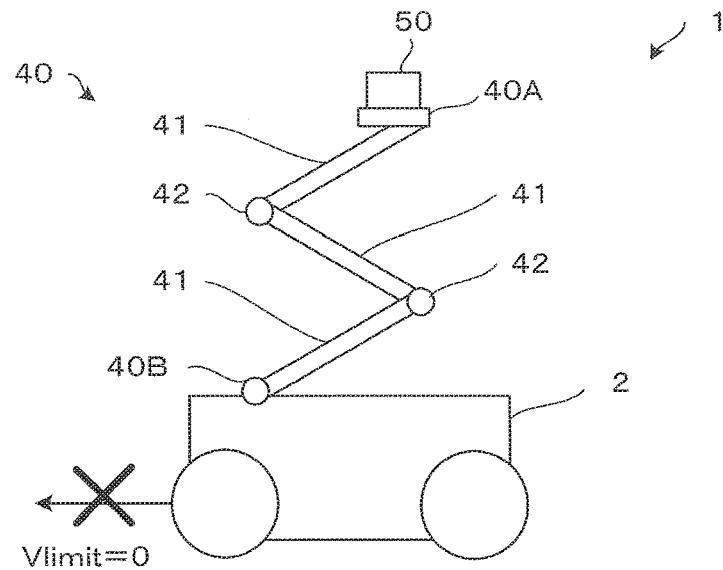
FIG. 17 is a view for explaining a monitoring traveling processing (step S2) as an operation of the autonomous traveling apparatus 1 according to the second embodiment of the present invention.
Figure 18:
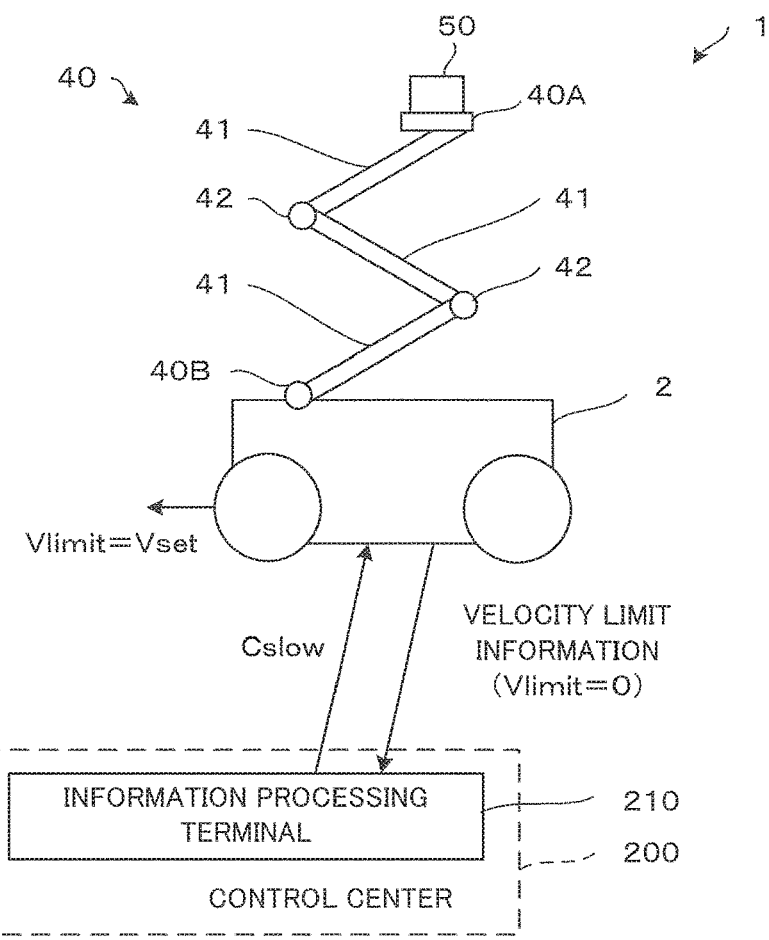
FIG. 18 is a view for explaining a monitoring traveling processing (step S2) as the operation of the autonomous traveling apparatus 1 according to the second embodiment of the present invention.

FIGS. 17 and 18 are views for explaining monitoring traveling processing (step S2) as the operation of the autonomous traveling apparatus 1 according to the second embodiment of the present invention.

In the monitoring traveling processing (step S2), when the position "H" of the one end 40A of the boom 40 is at the highest position "Hmax" (see FIG. 16) as illustrated in FIG. 17, the state control portion 25 (FIG. 15) of the autonomous traveling apparatus 1 calculates "0" as the velocity limit "Vlimit" of the apparatus main body 2 by the equation "Vlimit=Vmax−(Hmax×C1)=0" (see FIG. 16). In this case, the state control portion 25 (FIG. 15) outputs, to the autonomous traveling control portion 23 (FIG. 15), velocity limit information for designating "0" as the velocity limit "Vlimit" of the apparatus main body 2. The autonomous traveling control portion 23 (FIG. 15) prohibits traveling of the apparatus main body 2 according to the velocity limit information. At this time, as shown in FIG. 18, the state control portion 25 (FIG. 15) transmits, to the information processing terminal 210, the velocity limit information (Vlimit=0) for designating "0" as the velocity limit "Vlimit" of the apparatus main body 2 to thereby notify the control center 200 that traveling of the apparatus main body 2 is prohibited.

Here, in the monitoring traveling processing (step S2), the information processing terminal 210 in the control center 200 receives the velocity limit information (Vlimit=0) as shown in FIG. 18. At this time, there is a case where the user desires to forcibly cause the apparatus main body 2 to travel in a state that the position "H" of the one end 40A of the boom 40 is at the highest position "Hmax". In this case, the user uses the information processing terminal 210 to output the slowdown control command Cslow from the control center 200. In response to the slowdown control command Cslow, the state control portion 25 (FIG. 15) of the autonomous traveling apparatus 1 calculates the set velocity "Vset" as the velocity limit "Vlimit" of the apparatus main body 2 by the equation "Vlimit=Vset" (see FIG. 16). In this case, the state control portion 25 (FIG. 15) outputs, to the autonomous traveling control portion 23 (FIG. 15), velocity limit information for designating the set velocity "Vset" as the velocity limit "Vlimit" of the apparatus main body 2. The autonomous traveling control portion 23 (FIG. 15) causes the apparatus main body 2 to autonomously travel at the set velocity "Vset" according to the velocity limit information.

According to the description above, in the autonomous traveling apparatus 1 according to the second embodiment of the present invention, when the position "H" of the one end 40A of the boom 40 is at the highest position "Hmax", the state control portion 25 controls the autonomous traveling control portion 23 so as to prohibit traveling of the apparatus main body 2. When receiving the slowdown control command "Cslow" in a state that traveling of the apparatus main body 2 is prohibited, the state control portion 25 controls, in response to the slowdown control command "Cslow", the autonomous traveling control portion 23 so as to cause the apparatus main body 2 to autonomously travel at the velocity "Vset" at which traveling of the apparatus main body 2 is able to be stopped immediately.

In this manner, with the autonomous traveling apparatus 1 according to the second embodiment of the present invention, when continuously monitoring a moving suspicious object (or suspicious person) even in the state of prohibiting traveling of the apparatus main body 2, the apparatus main body 2 is caused to autonomously travel at the velocity "Vset" at which traveling of the apparatus main body 2 is able to be stopped immediately in response to the slowdown control command "Cslow". This makes it possible for the autonomous traveling apparatus 1 provided with the boom 40 to further continuously monitor the moving suspicious object (or suspicious person) with use of the monitoring camera 50.

Third Embodiment

Though the apparatus main body 2 is caused to autonomously travel in consideration of a traveling parameter in the autonomous traveling apparatus 1 according to the second embodiment of the present invention, there is no limitation thereto. In an autonomous traveling apparatus 1 according to a third embodiment of the present invention, the apparatus main body 2 may be caused to autonomously travel in consideration of both a traveling parameter and an external parameter. Changes compared to the second embodiment will be described in the third embodiment.

Figure 19:
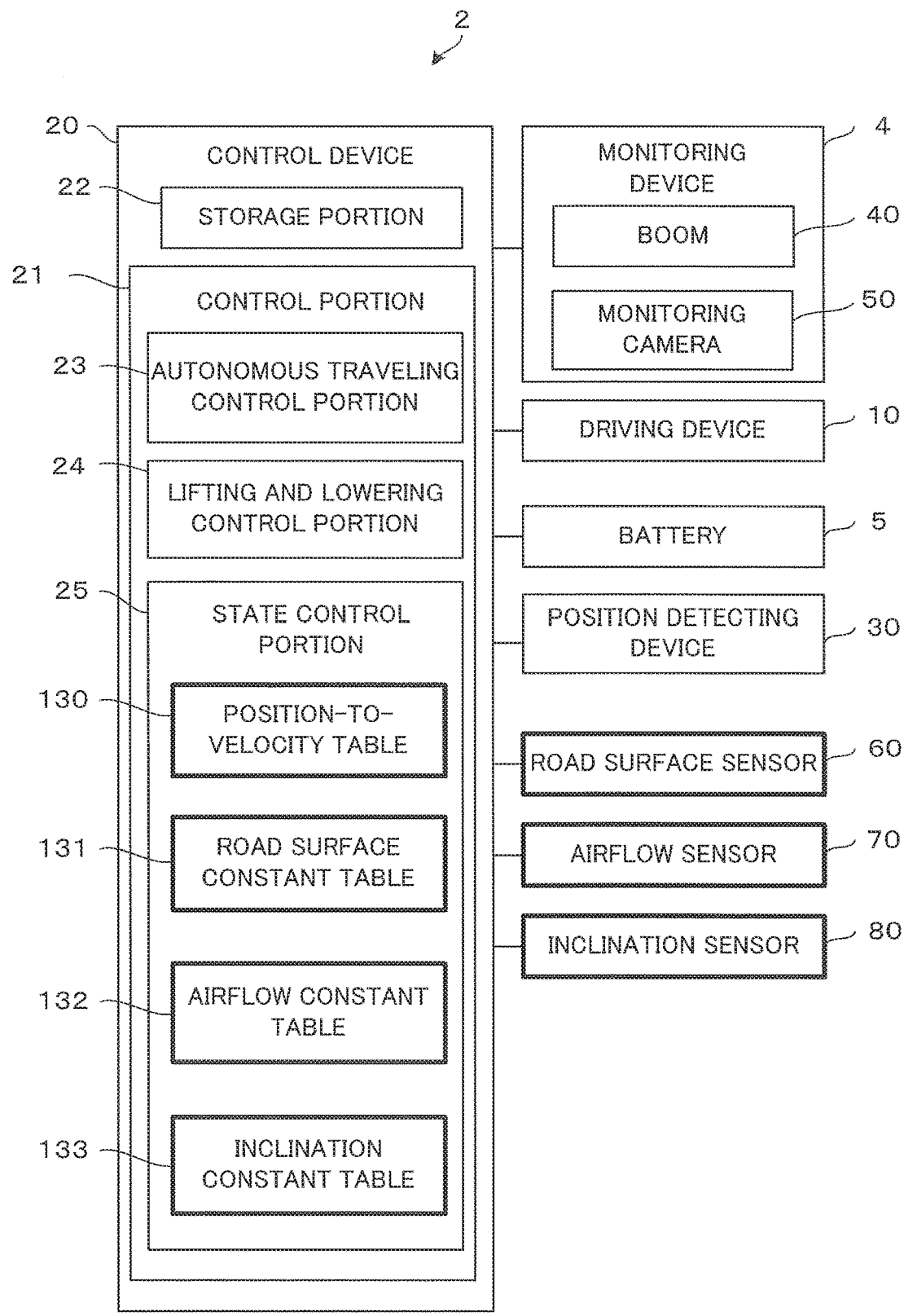
FIG. 19 is a block diagram illustrating an electric configuration of an autonomous traveling apparatus 1 according to a third embodiment of the present invention.

FIG. 19 is a block diagram illustrating an electric configuration of the autonomous traveling apparatus 1 according to the third embodiment of the present invention.

As shown in FIG. 19, the apparatus main body 2 of the autonomous traveling apparatus 1 further includes a road surface sensor 60, an airflow sensor 70, and an inclination sensor 80.

The road surface sensor 60 is a sensor for measuring instability in consideration of moisture, an amount of freezing, a snowfall, and the like on a road surface with respect to the apparatus main body 2.

The airflow sensor 70 is a sensor for measuring an airflow (wind velocity) against the apparatus main body 2.

The inclination sensor 80 is a sensor for measuring an inclination angle of the apparatus main body 2.

The state control portion 25 controls the autonomous traveling control portion 23 so that a traveling parameter is limited based on the position of the one end 40A (FIG. 1) of the boom 40 (FIGS. 1 and 19) and the external parameter. The traveling parameter is the velocity of the apparatus main body 2, and the external parameter includes at least one of a road surface, an airflow (wind velocity), and an inclination angle.

As shown in FIG. 19, the state control portion 25 includes a position-to-velocity table 130, a road surface constant table 131, an airflow constant table 132, and an inclination constant table 133 instead of the position-to-velocity table 120.

FIG. 20 shows the position-to-velocity table 130 in the autonomous traveling apparatus 1 according to the third embodiment of the present invention.

When a velocity limit of the apparatus main body 2 (FIGS. 1, 2 and 19) is "Vlimit", a maximum velocity is "Vmax", a position (height) of the one end 40A (FIG. 1) of the boom 40 (FIGS. 1 and 19) is "H", a constant is "C1", and stability, an airflow (wind velocity), and an inclination angle of the road surface are "P1", "P2", and "P3", respectively, in the position-to-velocity table 130, the velocity limit "Vlimit" of the apparatus main body 2 (FIGS. 1, 2 and 19) is determined by the equation "Vlimit=Vmax−((H×C1)×(P1×P2×P3))".

In the position-to-velocity table 130, the instability "P1", the airflow (wind velocity) "P2", and the inclination angle "P3" of the road surface are represented by values in a range of "1" to "2". When a state of the road surface is good and there is no airflow (wind velocity) and inclination angle, the instability "P1", the airflow (wind velocity) "P2", and the inclination angle "P3" of the road surface are all "1", and the velocity limit "Vlimit" of the apparatus main body 2 (FIGS. 1, 2 and 19) is determined by the equation "Vlimit=Vmax−(H× C1)" similarly to the first and second embodiments.

Here, when a calculation result of the velocity limit "Vlimit" of the apparatus main body 2 (FIGS. 1, 2 and 19) is smaller than 0 based on the equation "Vlimit=Vmax−((H×C1)×(P1×P2×P3))" (in the case of Vlimit<0) in the position-to-velocity table 130, the velocity limit "Vlimit" is set as 0 (set as Vlimit=0).

Further, in a case where the slowdown control command Cslow is output from the control center 200 (FIG. 18) in a state that the position "H" of the one end 40A (FIG. 1) of the boom 40 (FIGS. 1 and 19) is not "0" and in a state that the velocity limit "Vlimit" of the apparatus main body 2 (FIGS. 1, 2 and 19) is "0" in the position-to-velocity table 130, the velocity limit "Vlimit" of the apparatus main body 2 (FIGS. 1, 2 and 19) is forcibly determined by Vlimit=Vset as a velocity at which traveling of the apparatus main body 2 (FIGS. 1, 2 and 19) is able to be stopped immediately.

FIG. 21 shows the road surface constant table 131 in the autonomous traveling apparatus 1 according to the third embodiment of the present invention.

In the road surface/constant table 131, a value measured by the road surface sensor 60 is associated with the constant P1. When the state of the road surface is good, the value measured by the road surface sensor 60 as the instability of the road surface is "0". When the instability of the road surface is "0", the constant P1 is set to "1". When the state of the road surface is bad, the value measured by the road surface sensor 60 as the instability of the road surface is greater than "0". When the value measured by the road surface sensor 60 as the instability of the road surface is a set value "u" or more, the constant P1 is set to "2". When the value measured by the road surface sensor 60 as the instability of the road surface is greater than "0" and less than the set value "a", the constant P1 is set to the value between "1" to "2".

FIG. 22 shows the airflow constant table 132 in the autonomous traveling apparatus 1 according to the third embodiment of the present invention.

In the airflow constant table 132, a value measured by the airflow sensor 70 is associated with the constant P2. When there is no wind, the value measured by the airflow sensor 70 as the airflow (wind velocity) is "0". When the airflow (wind velocity) is "0", the constant P2 is set to "1". When there is wind, the value measured by the airflow sensor 70 as the airflow (wind velocity) is greater than "0". When the value measured by the airflow sensor 70 as the airflow (wind velocity) is a set value "C3" or more, the constant P2 is set to "2". When the value measured by the airflow sensor 70 as the airflow (wind velocity) is greater than "0" and less than the set value "B", the constant P2 is set to the value between "1" to "2".

FIG. 23 shows the inclination constant table 133 in the autonomous traveling apparatus 1 according to the third embodiment of the present invention.

In the inclination constant table 133, a value measured by the inclination sensor 80 is associated with the constant P3. When the apparatus main body 2 is not inclined, the value measured by the inclination sensor 80 as the inclination angle is "0". When the inclination angle is "0", the constant P3 is set to "1". When the apparatus main body 2 is inclined, the value measured by the inclination sensor 80 as the inclination angle is greater than "0". When the value measured by the inclination sensor 80 as the inclination angle is a set value "y" or more, the constant P3 is set to "2". When the value measured by the inclination sensor 80 as the inclination angle is greater than "0" and less than the set value "y", the constant P3 is set to the value between "1" to "2".

Next, an operation of the autonomous traveling apparatus 1 according to the third embodiment of the present invention will be described.

In the monitoring traveling processing (step S2), it is assumed that any of the instability "P1", the airflow (wind velocity) "P2", and the inclination angle "P3" of the road surface is greater than "1" (see FIGS. 21 to 23). The state control portion 25 (FIG. 19) of the autonomous traveling apparatus 1 calculates the velocity limit "Vlimit" of the apparatus main body 2 by the equation "Vlimit=Vmax−((H× C1)×(P1×P2×P3))" (see FIG. 20). Here, when an obtained calculation result is smaller than 0 (in the case of Vlimit<0) as shown in FIG. 20, the velocity limit "Vlimit" is set to 0 (set to Vlimit=0). In this case, the state control portion 25 (FIG. 19) outputs, to the autonomous traveling control portion 23 (FIG. 19), velocity limit information for designating "0" as the velocity limit "Vlimit" of the apparatus main body 2 (FIG. 19). The autonomous traveling control portion 23 (FIG. 19) prohibits traveling of the apparatus main body 2 (FIG. 19) according to the velocity limit information.

Here, in the monitoring traveling processing (step S2), a slowdown control command Cslow is output from the control center 200 (FIG. 18). In this case, the state control portion 25 (FIG. 19) of the autonomous traveling apparatus 1 calculates a set velocity "Vset" as the velocity limit "Vlimit" of the apparatus main body 2 based on the equation "Vlimit=Vset" (see FIG. 20). In this case, the state control portion 25 (FIG. 19) outputs, to the autonomous traveling control portion 23 (FIG. 19), velocity limit information for designating the set velocity "Vset" as the velocity limit "Vlimit" of the apparatus main body 2. The autonomous traveling control portion 23 (FIG. 19) causes the apparatus main body 2 (FIG. 19) to autonomously travel at the set velocity "Vset" according to the velocity limit information.

According to the description above, in the autonomous traveling apparatus 1 according to the third embodiment of the present invention, the state control portion 25 controls the autonomous traveling control portion 23 so that the traveling parameter (velocity of the apparatus main body 2) is limited based on the position "H" of the one end 40A of the boom 40 and the external parameter (the instability "P1", the airflow (wind velocity) "P2", and/or the inclination angle "P3" of the road surface). Here, the external parameter includes at least one of the instability "P1", the airflow (wind velocity) "P2", and the inclination angle "P3" of the road surface.

In this manner, with the autonomous traveling apparatus 1 according to the third embodiment of the present invention, the traveling parameter (velocity of the apparatus main body 2) is limited based on the position "H" of the one end 40A of the boom 40 and the external parameter (the instability "P1", the airflow (wind velocity) "P2", and/or the inclination angle "P3" of the road surface). For example, when a calculation result of the velocity limit "Vlimit" of the apparatus main body 2 is smaller than 0 (in the case of Vlimit<0) due to at least one factor of the instability "P1", the airflow (wind velocity) "P2", and the inclination angle "P3" of the road surface as the external parameter, the autonomous traveling apparatus 1 prohibits traveling of the apparatus main body 2. This makes it possible to prevent the autonomous traveling apparatus 1 from being brought into a dangerous state such as overturning and also possible to continuously monitor a suspicious object (or a suspicious person) moving to a high position with use of the monitoring camera 50. Thus, it is possible to safely perform autonomous traveling and lifting and lowering of the one end 40A of the boom 40 in the autonomous traveling apparatus 1 provided with the boom 40.

Fourth Embodiment

Though the apparatus main body 2 is caused to autonomously travel in consideration of the velocity of the apparatus main body 2 as the traveling parameter in the autonomous traveling apparatus 1 according to the third embodiment of the present invention, there is no limitation thereto. In an autonomous traveling apparatus 1 according to a fourth embodiment of the present invention, the apparatus main body 2 may be caused to autonomously travel also in consideration of a moving direction of the apparatus main body 2 as the traveling parameter. Changes compared to the third embodiment will be described in the fourth embodiment.

Figure 24:
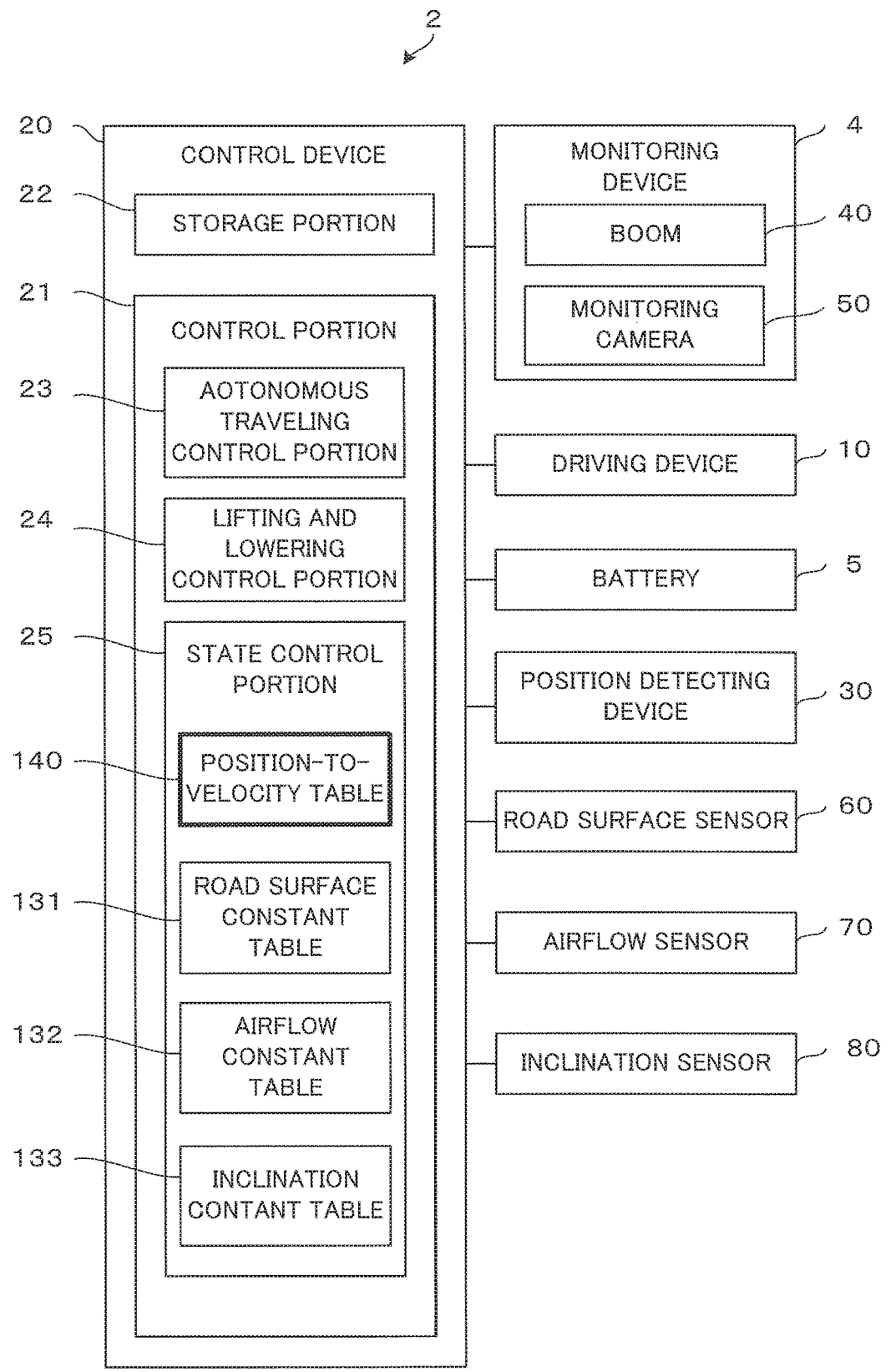
FIG. 24 is a block diagram illustrating an electric configuration of an autonomous traveling apparatus 1 according to a fourth embodiment of the present invention.

FIG. 24 is a block diagram illustrating an electric configuration of the autonomous traveling apparatus 1 according to the fourth embodiment of the present invention.

The state control portion 25 controls the autonomous traveling control portion 23 so that traveling parameters are limited based on the position of the one end 40A (FIG. 1) of the boom 40 (FIGS. 1 and 24) and an external parameter. The traveling parameters are the velocity of the apparatus main body 2 and the moving direction of the apparatus main body 2, and the external parameter includes at least one of a road surface, an airflow (wind velocity), and an inclination angle.

As shown in FIG. 24, the state control portion 25 includes a position-to-velocity table 140 instead of the position-to-velocity table 130.

FIG. 25 illustrates the position-to-velocity table 140 in the autonomous traveling apparatus 1 according to the fourth embodiment of the present invention.

When a velocity limit of the apparatus main body 2 (FIGS. 1, 2 and 24) is "Vlimit", a maximum velocity is "Vmax", a position (height) of the one end 40A (FIG. 1) of the boom 40 (FIGS. 1 and 24) is "H", a constant is "C1", and stability, an airflow (wind velocity), and an inclination angle of the road surface are "P1", "P2", and "P3", respectively, in the position-to-velocity table 140, the velocity limit "Vlimit" of the apparatus main body 2 (FIGS. 1, 2 and 24) is determined by the equation "Vlimit=Vmax−((H×C1)× (P1×P2×P3))".

Here, when a calculation result of the velocity limit "Vlimit" of the apparatus main body 2 (FIGS. 1, 2 and 24) is smaller than 0 based on the equation "Vlimit=Vmax− ((H×C1)×(P1×P2×P3))" (in the case of Vlimit<0) in the position-to-velocity table 140, the velocity limit "Vlimit" is set as 0 (set as Vlimit=0).

Further, in a case where a slowdown control command Cslow is output from the control center 200 (FIG. 18) in a state that the position "H" of the one end 40A (FIG. 1) of the boom 40 (FIGS. 1 and 24) is not "0" and in a state that the velocity limit "Vlimit" of the apparatus main body 2 (FIGS. 1, 2 and 24) is "0" in the position-to-velocity table 140, the velocity limit "Vlimit" of the apparatus main body 2 (FIGS. 1, 2 and 24) is forcibly determined by Vlimit=Vset as a velocity at which traveling of the apparatus main body 2 (FIGS. 1, 2 and 24) is able to be stopped immediately.

Further, when the position "H" of the one end 40A (FIG. 1) of the boom 40 (FIGS. 1 and 24) is equal to or more than "Hmax/2" indicating a position of one half of the highest position "Hmax" in the position-to-velocity table 140, the moving direction of the apparatus main body 2 (FIGS. 1, 2 and 24) is limited. For example, when the position "H" of the one end 40A (FIG. 1) of the boom 40 (FIGS. 1 and 24) is equal to or more than "Hmax/2" and less than "Hmax", the velocity of slalom traveling or stationary rotation is limited to one half of the velocity limit "Vlimit". When the position "H" of the one end 40A (FIG. 1) of the boom 40 (FIGS. 1 and 24) is "Hmax", slalom traveling or stationary rotation is prohibited.

The state control portion 25 (FIG. 24) controls the autonomous traveling control portion 23 (FIG. 24) so that the moving direction of the apparatus main body 2 (FIGS. 1, 2 and 24) is limited by limitation of the moving direction according to the position "H" of the one end 40A (FIG. 1) of the boom 40 (FIGS. 1 and 24).

Next, an operation of the autonomous traveling apparatus 1 according to the fourth embodiment of the present invention will be described.

Figure 26:
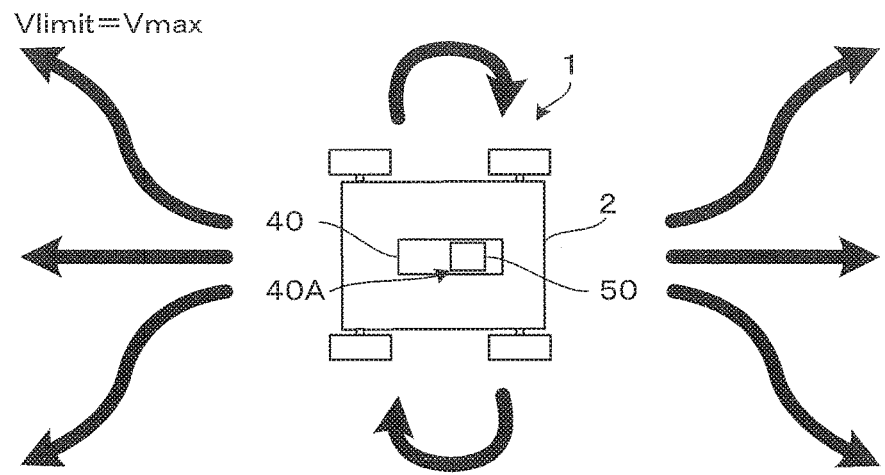
FIG. 26 is a view for explaining a monitoring traveling processing (step S2) as an operation of the autonomous traveling apparatus 1 according to the fourth embodiment of the present invention.
Figure 27:
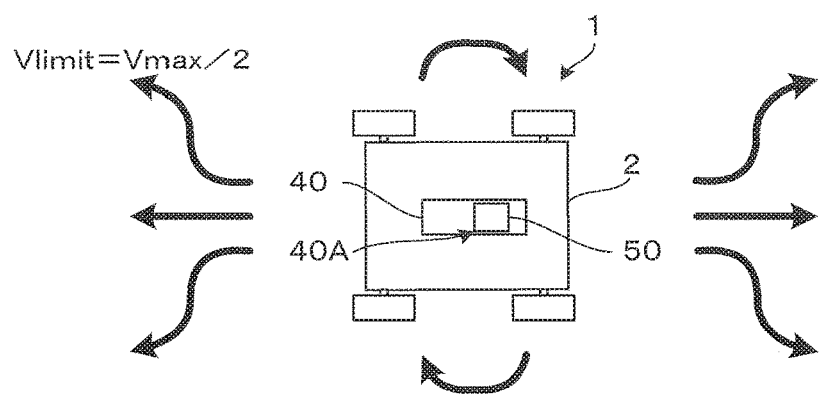
FIG. 27 is a view for explaining a monitoring traveling processing (step S2) as the operation of the autonomous traveling apparatus 1 according to the fourth embodiment of the present invention.
Figure 28:
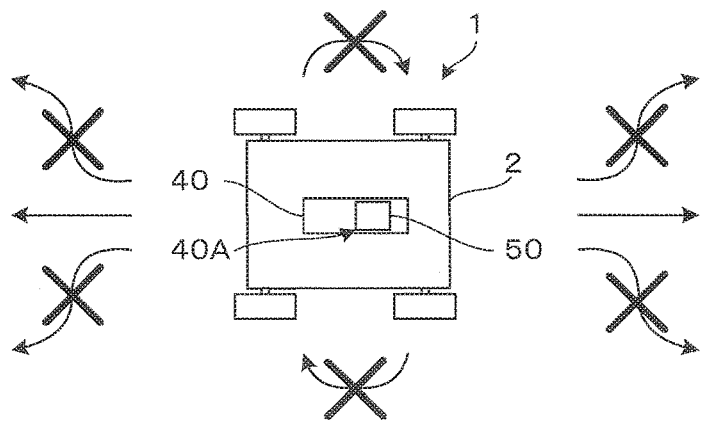
FIG. 28 is a view for explaining a monitoring traveling processing (step S2) as the operation of the autonomous traveling apparatus 1 according to the fourth embodiment of the present invention.

FIGS. 26 to 28 are views for explaining monitoring traveling processing (step S2) as the operation of the autonomous traveling apparatus 1 according to the fourth embodiment of the present invention.

In the monitoring traveling processing (step S2), when the position "H" of the one end 40A of the boom 40 is "0" indicating the lowest position (see FIG. 25), slalom traveling or stationary rotation is not limited as shown in FIG. 26. In this case, the state control portion 25 (FIG. 25) outputs, to the autonomous traveling control portion 23 (FIG. 25), velocity limit information for designating the velocity limit "Vlimit" of the apparatus main body 2 and direction limit information indicating that slalom traveling or stationary rotation is not limited. The autonomous traveling control portion 23 (FIG. 25) causes the apparatus main body 2 to autonomously travel according to the velocity limit information and the direction limit information.

Further, in the monitoring traveling processing (step S2), when the position "H" of the one end 40A of the boom 40 is "Hmax/2" indicating one half of the highest position "Hmax" (see FIG. 25), the velocity of slalom traveling or stationary rotation is limited to one half of the velocity limit "Vlimit" as shown in FIG. 27. In this case, the state control portion 25 (FIG. 25) outputs, to the autonomous traveling control portion 23 (FIG. 25), velocity limit information for designating the velocity limit "Vlimit" of the apparatus main body 2 and direction limit information indicating that the velocity of slalom traveling and/or stationary rotation is limited to one half of the velocity limit "Vlimit". The autonomous traveling control portion 23 (FIG. 25) causes the apparatus main body 2 to autonomously travel and limits the moving direction of the apparatus main body 2 according to the velocity limit information and the direction limit information.

Further, in the monitoring traveling processing (step S2), when the position "H" of the one end 40A of the boom 40 is the highest position "Hmax" (see FIG. 25), slalom traveling and/or stationary rotation are/is prohibited as illustrated in FIG. 28. In this case, the state control portion 25 (FIG. 25) outputs, to the autonomous traveling control portion 23 (FIG. 25), velocity limit information for designating the velocity limit "Vlimit" of the apparatus main body 2 (for example, designated as "0") and direction limit information indicating that slalom traveling and/or stationary rotation are/is prohibited. The autonomous traveling control portion 23 (FIG. 25) prohibits traveling of the apparatus main body 2 according to the velocity limit information and the direction limit information.

According to the description above, in the autonomous traveling apparatus 1 according to the fourth embodiment of the present invention, the traveling parameter is the moving direction of the apparatus main body 2, and the state control portion 25 controls the autonomous traveling control portion 23 so that the moving direction of the apparatus main body 2 is limited by limitation of the moving direction according to the position "H" of the one end 40A of the boom 40.

In this manner, with the autonomous traveling apparatus 1 according to the fourth embodiment of the present invention, the traveling parameters (velocity of the apparatus main body 2 and the moving direction of the apparatus main body 2) are limited based on the position "H" of the one end 40A of the boom 40 and the external parameter (the instability "P1", the airflow (wind velocity) "P2", and/or the inclination angle "P3" of the road surface). For example, when the position "H" of the one end 40A of the boom 40 is the highest position "Hmax", the autonomous traveling apparatus 1 prohibits slalom traveling and/or stationary rotation. Here, when a calculation result of the velocity limit "Vlimit" of the apparatus main body 2 is smaller than 0 (in the case of Vlimit<0) due to at least one factor of the instability "P1", the airflow (wind velocity) "P2", and the inclination angle "P3" of the road surface as the external parameter, the autonomous traveling apparatus 1 prohibits traveling of the apparatus main body 2. This makes it possible to prevent the autonomous traveling apparatus 1 from being brought into a dangerous state such as overturning and also possible to continuously monitor a suspicious object (or a suspicious person) moving to a high position with use of the monitoring camera 50. Thus, it is possible to safely perform autonomous traveling and lifting and lowering of the one end 40A of the boom 40 in the autonomous traveling apparatus 1 provided with the boom 40.

Fifth Embodiment

Though the apparatus main body 2 is caused to autonomously travel in consideration of the velocity of the apparatus main body 2 as the traveling parameter in the autonomous traveling apparatus 1 according to the fourth embodiment of the present invention, there is no limitation thereto. In an autonomous traveling apparatus 1 according to a fifth embodiment of the present invention, the apparatus main body 2 may be caused to autonomously travel also in consideration of acceleration and deceleration of the apparatus main body 2 as the traveling parameter. Changes compared to the fourth embodiment will be described in the fifth embodiment.

Figure 29:
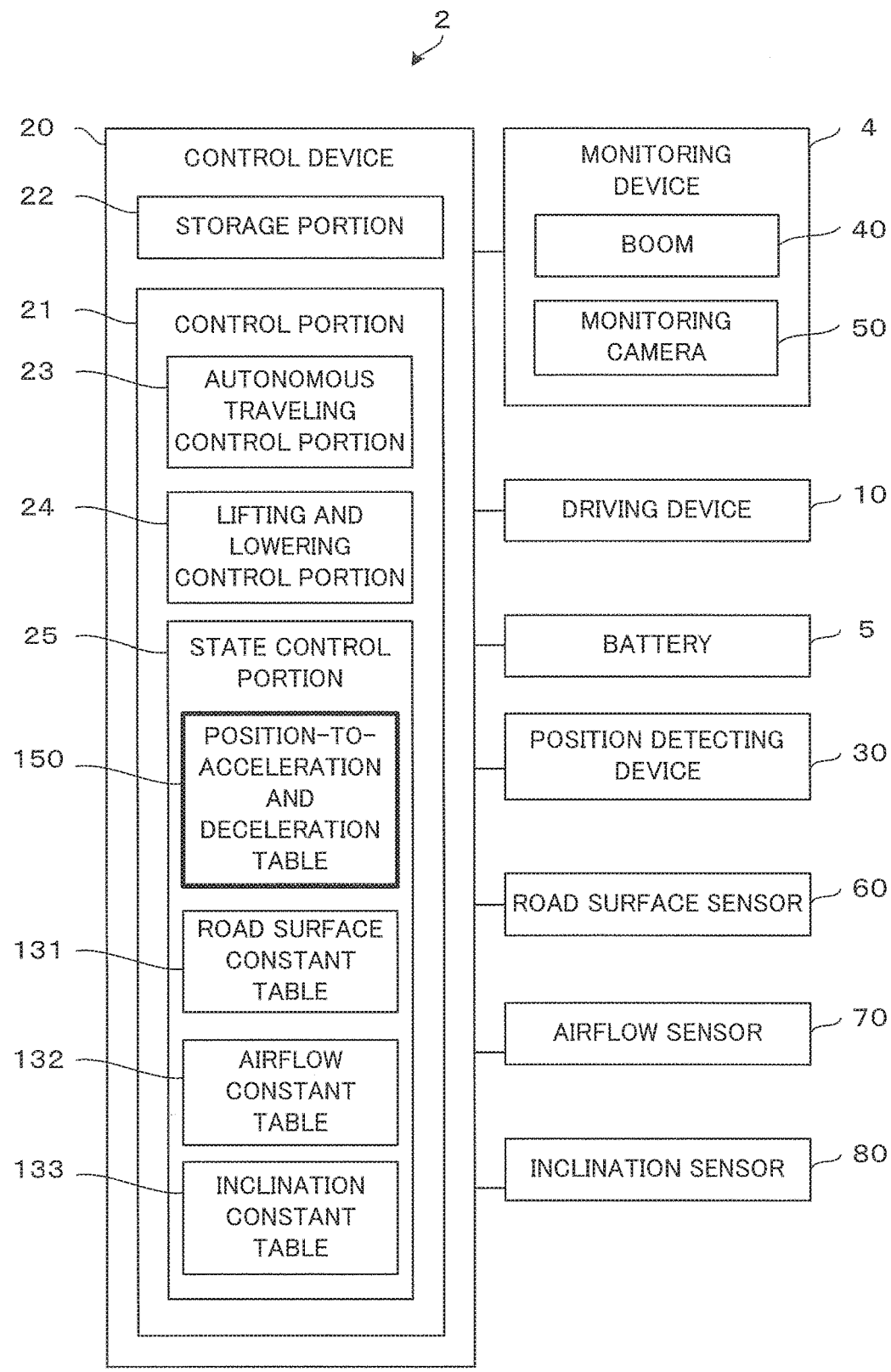
FIG. 29 is a block diagram illustrating an electric configuration of an autonomous traveling apparatus 1 according to a fifth embodiment of the present invention.

FIG. 29 is a block diagram illustrating an electric configuration of the autonomous traveling apparatus 1 according to the fifth embodiment of the present invention.

The state control portion 25 controls the autonomous traveling control portion 23 so that traveling parameters are limited based on the position of the one end 40A (FIG. 1) of the boom 40 (FIGS. 1 and 29) and an external parameter.

The traveling parameters are acceleration and deceleration of the apparatus main body 2 and the moving direction of the apparatus main body 2, and the external parameter includes at least one of a road surface, an airflow (wind velocity), and an inclination angle.

As shown in FIG. 29, the state control portion 25 includes a position-to-acceleration and deceleration table 150 instead of the position-to-velocity table 140.

FIG. 30 illustrates the position-to-acceleration and deceleration table 150 in the autonomous traveling apparatus 1 according to the fifth embodiment of the present invention.

When a limit value of acceleration and deceleration of the apparatus main body 2 (FIGS. 1, 2 and 29) is "ADlimit", a maximum value of acceleration and deceleration is "ADmax", a position (height) of the one end 40A (FIG. 1) of the boom 40 (FIGS. 1 and 29) is "H", a constant is "C2", and stability, an airflow (wind velocity), and an inclination angle of the road surface are "P1", "P2", and "P3", respectively, in the position-to-acceleration and deceleration table 150, the limit value of acceleration and deceleration "ADlimit" of the apparatus main body 2 (FIGS. 1, 2 and 29) is determined by the equation "ADlimit=ADmax−((H×C2)×(P1×P2×P3))".

Here, when a calculation result of the limit value of acceleration and deceleration "ADlimit" of the apparatus main body 2 (FIGS. 1, 2 and 29) is smaller than 0 based on the equation "ADlimit=ADmax=((H×C2)×(P1×P2×P3))" (in the case of ADlimit<0) in the position-to-acceleration and deceleration table 150, the limit value of the acceleration and deceleration "ADlimit" is set as 0 (set as ADlimit=0).

Further, when the position "H" of the one end 40A (FIG. 1) of the boom 40 (FIGS. 1 and 29) is equal to or more than "Hmax/2" indicating a position of one half of the highest position "Hmax" in the position-to-acceleration and deceleration table 150, the moving direction of the apparatus main body 2 (FIGS. 1, 2 and 29) is limited. For example, when the position "H" of the one end 40A (FIG. 1) of the boom 40 (FIGS. 1 and 29) is equal to or more than "Hmax/2" and less than "Hmax", the velocity of slalom traveling and/or stationary rotation are/is limited to one half of the velocity limit "Vlimit". When the position "H" of the one end 40A (FIG. 1) of the boom 40 (FIGS. 1 and 29) is "Hmax", slalom traveling or stationary rotation is prohibited.

The state control portion 25 (FIG. 29) controls the autonomous traveling control portion 23 (FIG. 29) so that the acceleration and deceleration of the apparatus main body 2 (FIGS. 1, 2 and 29) is limited by the equation "ADlimit=ADmax−((H×C2)×(P1×P2×P3))", that is, the limit value of the acceleration and deceleration "ADlimit" according to the position "H" of the one end 40A (FIG. 1) of the boom 40 (FIGS. 1 and 29).

In the autonomous traveling apparatus 1 according to the fifth embodiment of the present invention, the parameters are similar to those of the first to fourth embodiments when the velocity limit "Vlimit", the maximum velocity "Vmax", and the constant "C1" in the first to fourth embodiments are replaced with the limit value of the acceleration and deceleration "ADlimit", the maximum value of the acceleration and deceleration "ADmax", and the constant "C2", respectively. Thus, description for an operation of the autonomous traveling apparatus 1 according to the fifth embodiment of the present invention will be omitted.

According to the description above, in the autonomous traveling apparatus 1 according to the fifth embodiment of the present invention, the traveling parameter is acceleration and deceleration of the apparatus main body 2, and the state control portion 25 controls the autonomous traveling control portion 23 so that acceleration and deceleration of the apparatus main body 2 is limited by the limit value of acceleration and deceleration "ADlimit" according to the position "H" of the one end 40A of the boom 40.

In this manner, with the autonomous traveling apparatus 1 according to the fifth embodiment of the present invention, the traveling parameters (acceleration and deceleration of the apparatus main body 2 and the moving direction of the apparatus main body 2) are limited based on the position "H" of the one end 40A of the boom 40 and the external parameter (the instability "P1", the airflow (wind velocity) "P2", and/or the inclination angle "P3" of the road surface). For example, when a calculation result of the limit value of the acceleration and deceleration "ADlimit" of the apparatus main body 2 is smaller than 0 (in the case of ADlimit<0) due to at least one factor of the instability "P1", the airflow (wind velocity) "P2", and the inclination angle "P3" of the road surface as the external parameter, the autonomous traveling apparatus 1 prohibits acceleration and deceleration of the apparatus main body 2. This makes it possible to prevent the autonomous traveling apparatus 1 from being brought into a dangerous state such as overturning and also possible to continuously monitor a suspicious object (or a suspicious person) moving to a high position with use of the monitoring camera 50. Thus, it is possible to safely perform autonomous traveling and lifting and lowering of the one end 40A of the boom 40 in the autonomous traveling apparatus 1 provided with the boom 40.

Sixth Embodiment

Though traveling of the apparatus main body 2 is controlled based on the position of the one end 40A of the boom 40 in the autonomous traveling apparatus 1 according to the fourth embodiment, there is no limitation thereto. In an autonomous traveling apparatus 1 according to a sixth embodiment of the present invention, the position of the one end 40A of the boom 40 may be controlled based on traveling of the apparatus main body 2. Changes compared to the fourth embodiment will be described in the sixth embodiment.

Figure 31:
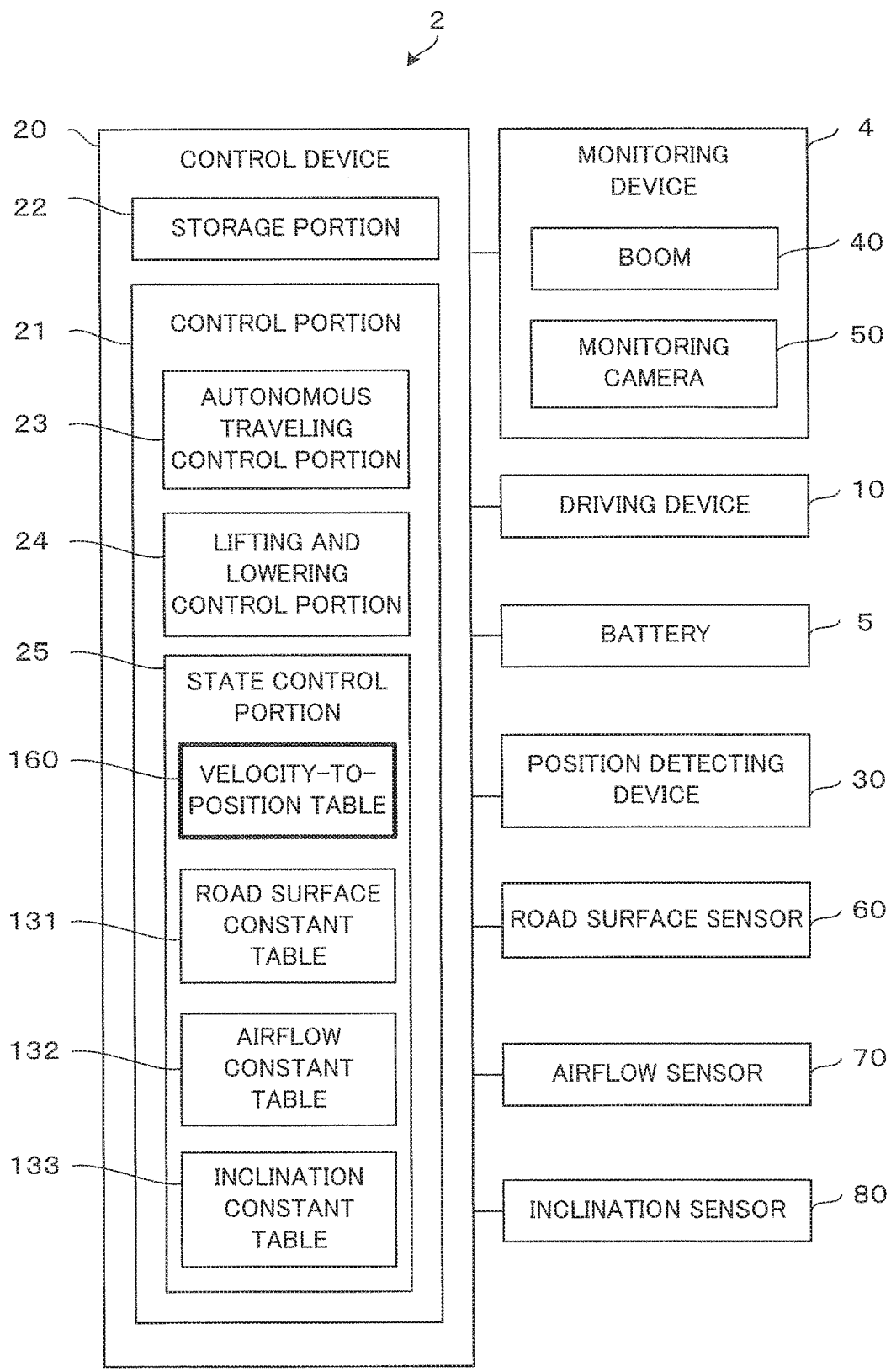
FIG. 31 is a block diagram illustrating an electric configuration of an autonomous traveling apparatus 1 according to a sixth embodiment of the present invention.

FIG. 31 is a block diagram illustrating an electric configuration of the autonomous traveling apparatus 1 according to the sixth embodiment of the present invention.

The state control portion 25 controls the lifting and lowering control portion 24 so that traveling parameters are limited based on the position of the one end 40A (FIG. 1) of the boom 40 (FIGS. 1 and 31) and an external parameter. The traveling parameters are the velocity of the apparatus main body 2 and the moving direction of the apparatus main body 2, and the external parameter includes at least one of a road surface, an airflow (wind velocity), and an inclination angle.

As shown in FIG. 31, the state control portion 25 includes a velocity-to-position table 160 instead of the position-to-velocity table 140 (FIG. 24).

FIG. 32 shows the velocity-to-position table 160 in the autonomous traveling apparatus 1 according to the sixth embodiment of the present invention.

When a limit value of the height of the apparatus main body 2 (FIGS. 1, 2 and 31) is "Hlimit", a maximum value of the height is "Hmax", a velocity of the apparatus main body 2 (FIGS. 1, 2 and 31) is "V", a constant is "C3", and stability, an airflow (wind velocity), and an inclination angle of the road surface are "P1", "P2", and "P3" respectively, in the velocity-to-position table 160, the limit value of the position (height) "Hlimit" of the one end 40A (FIG. 1) of the boom 40 (FIGS. 1 and 31) is determined by the equation "Hlimit=Hmax−((V×C3)×(P1×P2×P3))".

Here, when a calculation result of the limit value of the position (height) "Hlimit" of the one end 40A (FIG. 1) of the boom 40 (FIGS. 1 and 31) is smaller than 0 based on the equation "Hlimit=Hmax−((V×C3)×(P1×P2×P3))" (in the case of Hlimit<0) in the velocity-to-position table 160, the limit value of the position (height) "Hlimit" is set as 0 (set as Hlimit=0).

The state control portion 25 (FIG. 31) controls the lifting and lowering control portion 24 (FIG. 31) so that the position (height) of the one end 40A (FIG. 1) of the boom 40 (FIGS. 1 and 31) is limited by the equation "Hlimit=Hmax−((V×C3)×(P1×P2×P3))", that is, the limit value of the height "Hlimit" according to the velocity "V" of the apparatus main body 2 (FIGS. 1, 2 and 31).

In the autonomous traveling apparatus 1 according to the sixth embodiment of the present invention, the parameters are similar to those of the first to fourth embodiments when the velocity limit "Vlimit", the maximum velocity "Vmax", the height (position) "H", and the constant "C1" in the first to fourth embodiments are respectively replaced with the limit value of the height "Hlimit", the maximum value of the height "Hmax", velocity "V", and the constant "C3", respectively, and the autonomous traveling control portion 23 in the first to the fourth embodiments as the control target is replaced with the lifting and lowering control portion 24. Thus, description for an operation of the autonomous traveling apparatus 1 according to the sixth embodiment of the present invention will be omitted.

According to the description above, the autonomous traveling apparatus 1 according to the sixth embodiment of the present invention includes the apparatus main body 2, the autonomous traveling control portion 23 which causes the apparatus main body 2 to autonomously travel with a designated traveling parameter, the boom 40 provided on the apparatus main body 2, the lifting and lowering control portion 24 which lifts and lowers the position "H" of the one end 40A of the boom 40 to the designated height on the apparatus main body 2, and the state control portion 25 which controls the lifting and lowering control portion 24 so that the position "H" of the one end 40A of the boom 40 is limited based on the traveling parameter.

In the autonomous traveling apparatus 1 according to the sixth embodiment of the present invention, the traveling parameter is the velocity of the apparatus main body 2, and the state control portion 25 controls the lifting and lowering control portion 24 so that the position "H" of the one end 40A of the boom 40 is limited by the limit value of the height "Hlimit" according to the velocity "V" of the apparatus main body 2.

In this manner, with the autonomous traveling apparatus 1 according to the sixth embodiment of the present invention, the position "H" of the one end 40A of the boom 40 is limited based on the traveling parameter (velocity of the apparatus main body 2) and the external parameter (the instability "P1", the airflow (wind velocity) "P2", and/or the inclination angle "P3" of the road surface). For example, when a calculation result of the limit value of the height "Hlimit" of the one end 40A of the boom 40 is smaller than 0 (in the case of Hlimit<0) due to at least one factor of the instability "P1", the airflow (wind velocity) "P2", and/or the inclination angle "P3" of the road surface as the external parameter, the autonomous traveling apparatus 1 prohibits lifting and lowering of the one end 40A of the boom 40. This makes it possible to prevent the autonomous traveling apparatus 1 from being brought into a dangerous state such as overturning. Thus, it is possible to safely perform autonomous traveling and lifting and lowering of the one end 40A of the boom 40 in the autonomous traveling apparatus 1 provided with the boom 40.

Seventh Embodiment

Though the apparatus main body 2 is caused to autonomously travel in consideration of the velocity of the apparatus main body 2 as the traveling parameter in the autonomous traveling apparatus 1 according to the sixth embodiment of the present invention, there is no limitation thereto. In an autonomous traveling apparatus 1 according to a seventh embodiment of the present invention, the apparatus main body 2 may be caused to autonomously travel in consideration of acceleration and deceleration of the apparatus main body 2 as the traveling parameter. Changes compared to the sixth embodiment will be described in the seventh embodiment.

Figure 33:
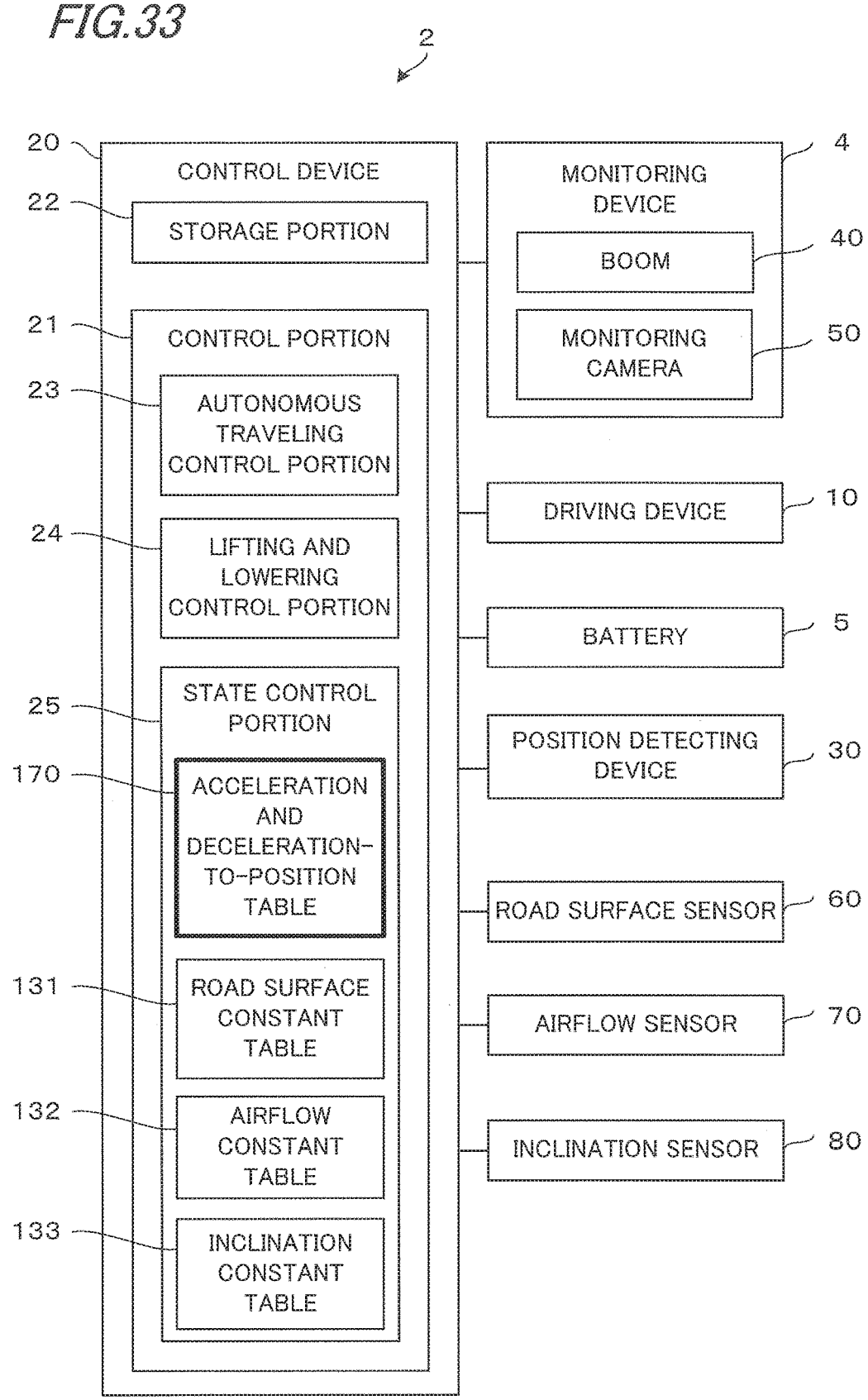
FIG. 33 is a block diagram illustrating an electric configuration of an autonomous traveling apparatus 1 according to a seventh embodiment of the present invention.

FIG. 33 is a block diagram illustrating an electric configuration of the autonomous traveling apparatus 1 according to the seventh embodiment of the present invention.

The state control portion 25 controls the lifting and lowering control portion 24 so that the position of the one end 40A (FIG. 1) of the boom 40 (FIGS. 1 and 33) is limited based on traveling parameters and an external parameter. The traveling parameters are the velocity of the apparatus main body 2 and the moving direction of the apparatus main body 2, and the external parameter includes at least one of a road surface, an airflow (wind velocity), and an inclination angle.

As shown in FIG. 33, the state control portion 25 includes an acceleration and deceleration-to-position table 170 instead of the velocity-to-position table 160.

FIG. 34 shows the acceleration and deceleration-to-position table 170 in the autonomous traveling apparatus 1 according to the seventh embodiment of the present invention.

When a limit value of the height of the apparatus main body 2 (FIGS. 1, 2 and 33) is "Hlimit", a maximum value of the height is "Hmax", a value of acceleration and deceleration of the apparatus main body 2 (FIGS. 1, 2 and 33) is "AD", a constant is "C4", and stability, an airflow (wind velocity), and an inclination angle of the road surface are "P1", "P2", and "P3" respectively, in the acceleration and deceleration-to-position table 170, the limit value of the position (height) "Hlimit" of the one end 40A (FIG. 1) of the boom 40 (FIGS. 1 and 33) is determined by the equation "Hlimit=Hmax−((AD×C4)×(P1×P2×P3))".

Here, when a calculation result of the limit value of the position (height) "Hlimit" of the one end 40A (FIG. 1) of the boom 40 (FIGS. 1 and 33) is smaller than 0 based on the equation "Hlimit=Hmax−((AD×C4)×(P1×P2×P3))" (in the case of Hlimit<0) in the acceleration and deceleration-to-position table 170, the limit value of the position (height) "Hlimit" is set as 0 (set as Hlimit=0).

The state control portion 25 (FIG. 33) controls the lifting and lowering control portion 24 (FIG. 33) so that the position (height) of the one end 40A (FIG. 1) of the boom 40 (FIGS. 1 and 33) is limited by the equation "Hlimit=Hmax−((AD×C4)×(P1×P2×P3))", that is, the limit value of the height "Hlimit" according to the value of acceleration and deceleration "AD" of the apparatus main body (FIGS. 1, 2 and 33).

In the autonomous traveling apparatus 1 according to the seventh embodiment of the present invention, the parameters are similar to those of the sixth embodiment when the velocity "V" and the constant "C3" in the sixth embodiment are replaced with the value of acceleration and deceleration "AD" and the constant "C4", respectively. Thus, description for an operation of the autonomous traveling apparatus 1 according to the seventh embodiment of the present invention will be omitted.

According to the description above, in the autonomous traveling apparatus 1 according to the seventh embodiment of the present invention, the traveling parameter is acceleration and deceleration of the apparatus main body 2, and the state control portion 25 controls the lifting and lowering portion 24 so that the position "H" of the one end 40A of the boom 40 is limited by the limit value of the height "Hlimit" according to the value of acceleration and deceleration "AD" of the apparatus main body 2.

In this manner, with the autonomous traveling apparatus 1 according to the seventh embodiment of the present invention, the position "H" of the one end 40A of the boom 40 is limited based on the traveling parameter (acceleration and deceleration of the apparatus main body 2) and the external parameter (the instability "P1", the airflow (wind velocity) "P2", and/or the inclination angle "P3" of the road surface). For example, when a calculation result of the limit value of the height "Hlimit" of the one end 40A of the boom 40 is smaller than 0 (in the case of Hlimit<0) due to at least one factor of the instability "P1", the airflow (wind velocity) "P2", and the inclination angle "P3" of the road surface as the external parameter, the autonomous traveling apparatus 1 prohibits lifting of the one end 40A of the boom 40. This makes it possible to prevent the autonomous traveling apparatus 1 from being brought into a dangerous state such as overturning. Thus, it is possible to safely perform autonomous traveling and lifting and lowering of the one end 40A of the boom 40 in the autonomous traveling apparatus 1 provided with the boom 40.

As described above, the present invention is not limited to the aforementioned embodiments and may be variously changed within the scope of the claims. That is, an embodiment obtained by appropriately combining technical means changed within the scope of the claims is also included in the technical scope of the present invention.

DESCRIPTION OF REFERENCE NUMERALS 1 autonomous traveling apparatus
2 apparatus main body
2F rear side portion
2F front side portion
2L side surface portion
2R side surface portion
3 wheel
3-1 front wheel
3-2 rear wheel
4 monitoring device
5 battery
10 driving device
11 electric motor (driving source)
12 transmission
12A shaft
13 axle
13-1 front-wheel axle
13-2 rear-wheel axle
14-1 front-wheel sprocket
14-2 rear-wheel sprocket
15 belt
16 bearing
20 control device
21 control portion
22 storage portion
23 autonomous traveling control portion
24 lifting and lowering control portion
25 state control portion
30 position detecting device
40 boom
40A one end
40B the other end
41 boom member
42 joint member
50 monitoring camera
60 road surface sensor
70 airflow sensor
80 inclination sensor
110 position-to-velocity table
130 position-to-velocity table
131 road surface constant table
132 airflow constant table
133 inclination constant table
140 position-to-velocity table
150 position-to-acceleration and deceleration table
160 velocity-to-position table
170 acceleration and deceleration-to-position table
200 control center
210 control device
211 control portion
212 storage portion

What is claimed is:

1. An autonomous traveling apparatus, comprising:
    an apparatus main body;
    an autonomous traveling controller which causes the apparatus main body to autonomously travel with a designated traveling parameter;
    a boom provided on the apparatus main body;
    a lifting and lowering controller which lifts and lowers a position of one end of the boom to a designated height on the apparatus main body;
    a state controller which controls the autonomous traveling controller so that the traveling parameter is limited based on the position of the one end of the boom or controls the lifting and lowering controller so that the position of the one end of the boom is limited based on the traveling parameter; and
    when a slowdown control command is received from an outside of the autonomous traveling apparatus and the position of the one end of the boom is at a highest position, the state controller controls the autonomous traveling controller in response to the slowdown control command so as to cause the apparatus main body to autonomously travel, wherein:
        a single input of the slow down control command causes continuous travel of the apparatus main body at a set velocity; and
        the set velocity is a velocity at which traveling of the apparatus main body is able to be stopped immediately.

2. The autonomous traveling apparatus according to claim 1, wherein
    the traveling parameter is a velocity of the apparatus main body, and
    the state controller controls the autonomous traveling controller so that the velocity of the apparatus main body is limited based on a velocity limit according to the position of the one end of the boom.

3. The autonomous traveling apparatus according to claim 2, wherein the state controller,
when the position of the one end of the boom is at a highest position, controls the autonomous traveling controller so as to prohibit traveling of the apparatus main body.

4. The autonomous traveling apparatus according to claim 1, wherein
the traveling parameter is acceleration and deceleration of the apparatus main body, and
the state controller controls the autonomous traveling controller so that the acceleration and deceleration of the apparatus main body is limited by a limit value of the acceleration and deceleration according to the position of the one end of the boom.

5. The autonomous traveling apparatus according to claim 1, wherein
the traveling parameter is a moving direction of the apparatus main body, and
the state controller controls the autonomous traveling controller so that the moving direction of the apparatus main body is limited by limit of the moving direction according to the position of the one end of the boom.

6. The autonomous traveling apparatus according to claim 1, wherein
the traveling parameter is a velocity of the apparatus main body, and
the state controller controls the lifting and lowering controller so that the position of the one end of the boom is limited by a limit value of height according to the velocity of the apparatus main body.

7. The autonomous traveling apparatus according to claim 1, wherein
the state controller controls the autonomous traveling controller so that the traveling parameter is limited based on the position of the one end of the boom and an external parameter, or controls the lifting and lowering controller so that the position of the one end of the boom is limited based on the traveling parameter and the external parameter.

8. The autonomous traveling apparatus according to claim 7, wherein
the external parameter includes at least one of a road surface, an airflow, and an inclination angle.

9. An autonomous traveling apparatus, comprising:
an apparatus main body;
an autonomous traveling controller which causes the apparatus main body to autonomously travel with a designated traveling parameter;
a boom provided on the apparatus main body;
a lifting and lowering controller which lifts and lowers a position of one end of the boom to a designated height on the apparatus main body; and
a state controller which controls the autonomous traveling controller so that the traveling parameter is limited based on the position of the one end of the boom or controls the lifting and lowering controller so that the position of the one end of the boom is limited based on the traveling parameter, wherein
the traveling parameter is acceleration and deceleration of the apparatus main body, and
the state controller controls the lifting and lowering controller so that the position of the one end of the boom is limited by a limit value of height according to a value of the acceleration and deceleration of the apparatus main body.

* * * * *